United States Patent
Cote et al.

(10) Patent No.: US 9,336,558 B2
(45) Date of Patent: May 10, 2016

(54) WAVEFRONT ENCODING WITH PARALLEL BIT STREAM ENCODING

(71) Applicant: Apple Inc., Cupertino, CA (US)

(72) Inventors: Guy Cote, San Jose (CA); Timothy John Millet, Moutain View, CA (US); Joseph J. Cheng, Palo Alto, CA (US); Mark P. Rygh, Union City, CA (US); Jim C. Chou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 14/039,845

(22) Filed: Sep. 27, 2013

(65) Prior Publication Data

US 2015/0091921 A1   Apr. 2, 2015

(51) Int. Cl.
*H04N 19/436* (2014.01)
*G06T 1/20* (2006.01)
*H04N 19/176* (2014.01)
*G06T 1/60* (2006.01)
*H04N 19/423* (2014.01)

(52) U.S. Cl.
CPC ................ *G06T 1/20* (2013.01); *H04N 19/436* (2014.11); *G06T 1/60* (2013.01); *H04N 19/176* (2014.11); *H04N 19/423* (2014.11)

(58) Field of Classification Search
None
See application file for complete search history.

(56) References Cited

U.S. PATENT DOCUMENTS

| | | | |
|---|---|---|---|
| 7,830,964 B2 | 11/2010 | Winger et al. | |
| 7,944,502 B2 * | 5/2011 | Mohapatra et al. | 348/448 |
| 2004/0085233 A1 * | 5/2004 | Linzer et al. | 341/107 |
| 2004/0263361 A1 * | 12/2004 | Pearson et al. | 341/50 |
| 2009/0060032 A1 * | 3/2009 | Schmit et al. | 375/240.01 |
| 2009/0097548 A1 | 4/2009 | Karczewicz et al. | |
| 2009/0168899 A1 * | 7/2009 | Schlanger et al. | 375/240.26 |
| 2010/0135383 A1 * | 6/2010 | Zhao et al. | 375/240.02 |
| 2011/0135008 A1 | 6/2011 | Han et al. | |
| 2012/0155781 A1 * | 6/2012 | Onoue | 382/238 |
| 2012/0229602 A1 | 9/2012 | Chen et al. | |
| 2012/0328004 A1 | 12/2012 | Coban et al. | |
| 2013/0114735 A1 | 5/2013 | Wang | |

(Continued)

OTHER PUBLICATIONS

ITU-T H2.64 "Series H: Audiovisual and Multimedia Systems Infrastructure of Audiovisual Services-Coding of Moving Video-Advanced video coding for generic audiovisual services" Apr. 2013 pp. 1-732.
Bao-chuan Li, et al "An Adaptive Method of CAVLC Scanning Based on Hardware" Hefei University of Technology, 2011, pp. 1-7 Reference considered, but could not determine publicatication month.
U.S. Appl. No. 14/039,859, filed Sep. 27, 2013, Guy Cote, et al.

*Primary Examiner* — Zhengxi Liu
*Assistant Examiner* — Ryan M Gray
(74) *Attorney, Agent, or Firm* — Robert C. Kowert; Meyertons, Hood, Kivlin, Kowert & Goetzel, P.C.

(57) ABSTRACT

In the video encoders described herein, blocks of pixels from a video frame may be encoded (e.g., using CAVLC encoding) in a block processing pipeline using wavefront ordering (e.g., in knight's order). Each of the encoded blocks may be written to a particular one of multiple DMA buffers such that the encoded blocks written to each of the buffers represent consecutive blocks of the video frame in scan order. A transcode pipeline may operate in parallel with (or at least overlapping) the operation of the block processing pipeline. The transcode pipeline may read encoded blocks from the buffers in scan order and merge them into a single bit stream (in scan order). A transcoder core of the transcode pipeline may decode the encoded blocks and encode them using a different encoding process (e.g., CABAC). In some cases, the transcoder may be bypassed.

19 Claims, 19 Drawing Sheets

(56) References Cited

U.S. PATENT DOCUMENTS

2013/0188699 A1 7/2013 Joshi et al.
2013/0230097 A1 9/2013 Sole Rojals et al.
2014/0348247 A1* 11/2014 Tsukuba et al. ......... 375/240.26

* cited by examiner

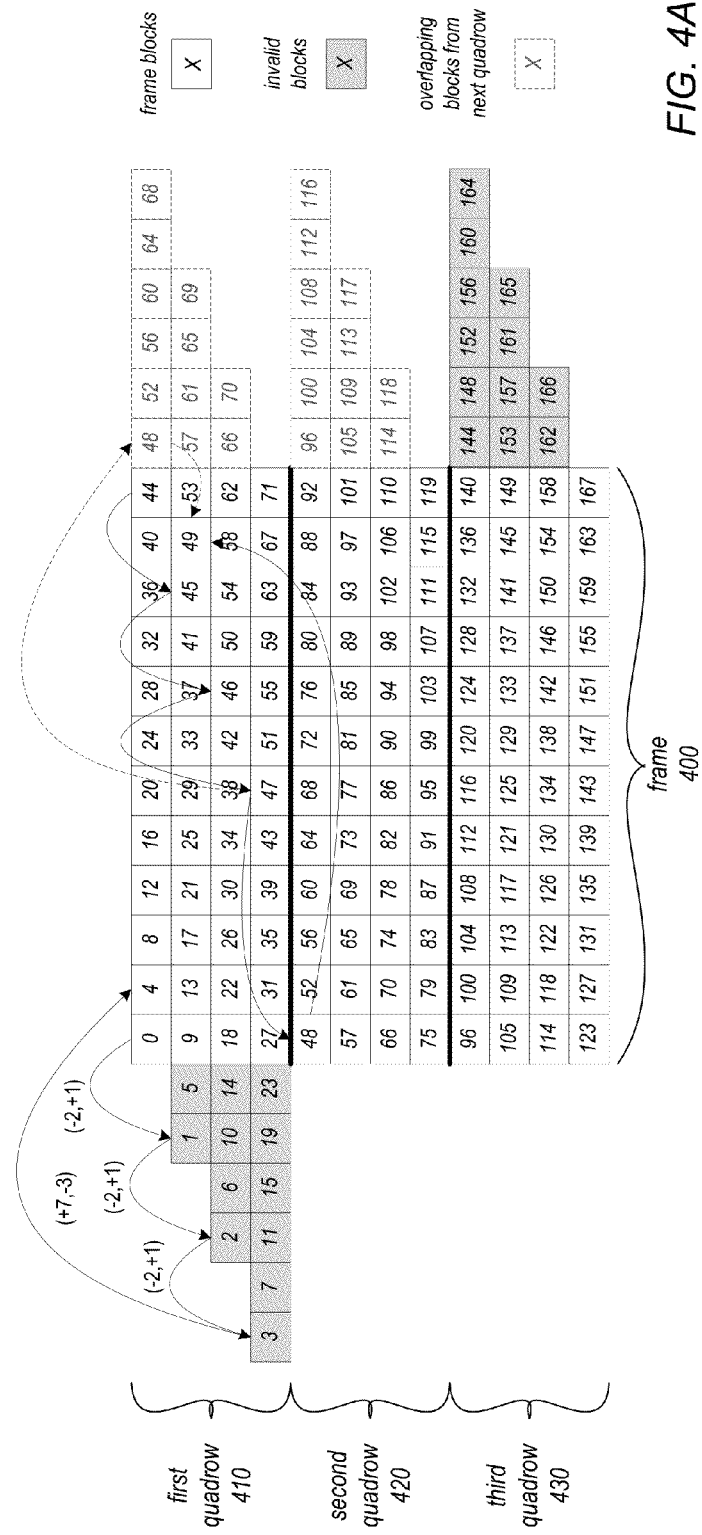
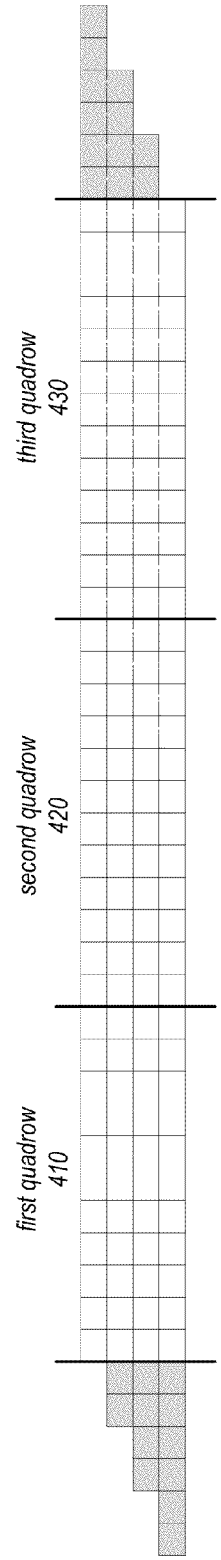
FIG. 4A
FIG. 4B

US 9,336,558 B2

WAVEFRONT ENCODING WITH PARALLEL BIT STREAM ENCODING

BACKGROUND

1. Technical Field

This disclosure relates generally to video or image processing, and more specifically to methods and apparatus for processing digital video frames in block processing pipelines.

2. Description of the Related Art

Various devices including but not limited to personal computer systems, desktop computer systems, laptop and notebook computers, tablet or pad devices, digital cameras, digital video recorders, and mobile phones or smart phones may include software and/or hardware that may implement a video processing method. For example, a device may include an apparatus (e.g., an integrated circuit (IC), such as a system-on-a-chip (SOC), or a subsystem of an IC), that may receive and process digital video input from one or more sources and output the processed video frames according to one or more video processing methods. As another example, a software program may be implemented on a device that may receive and process digital video input from one or more sources and output the processed video frames according to one or more video processing methods. As an example, a video encoder 110 as shown in FIG. 1 represents an apparatus, or alternatively a software program, in which digital video input (input frames 120) is encoded or converted into another format (output frames 130), for example a compressed video format such as H.264/Advanced Video Coding (AVC) format (also referred to as MPEG 4 Part 10), according to a video encoding method. An apparatus or software program such as a video encoder 110 may include multiple functional components or units, as well as external interfaces to, for example, video input sources and external memory.

In some video processing methods, to perform the processing, each input video frame 120 is divided into rows and columns of blocks of pixels (e.g., 16×16 pixel blocks), for example as illustrated in FIG. 2 which shows an example 192×192 pixel frame 120 divided into 144 16×16 pixel blocks (illustrated in FIG. 2 as blocks 220). Each block of an input video frame 120 is processed separately, and when done the processed blocks are combined to form the output video frame 130. This may be referred to as a block processing method. Conventionally, the blocks are processed by the block processing method in scan order as shown in FIG. 2, beginning at the first block of the first row of the frame (shown as block 0), sequentially processing the blocks across the row, and continuing at the first block of the next row when a row is complete.

A block processing method may include multiple processing steps or operations that are applied sequentially to each block in a video frame. To implement such a block processing method, an apparatus or software program such as a video encoder 110 may include or implement a block processing pipeline 140. A block processing pipeline 140 may include two or more stages, with each stage implementing one or more of the steps or operations of the block processing method. FIG. 1 shows an example video encoder 110 that implements an example block processing pipeline 140 that includes at least stages 142A through 142C. A block is input to a stage 142A of the pipeline 140, processed according to the operation(s) implemented by the stage 142A, and results are output to the next stage 142B (or as final output by the last stage 142). The next stage 142B processes the block, while a next block is input to the previous stage 142A for processing. Thus, blocks move down the pipeline from stage to stage, with each stage processing one block at a time and multiple stages concurrently processing different blocks. Conventionally, the blocks are input to and processed by the block processing pipeline 140 in scan order as shown in FIG. 2. For example, in FIG. 1, the first block of the first row of the frame shown in FIG. 2 (block 0) is at stage 142C, the second block (block 1) is at stage 142B, and the third block (block 2) is at stage 142A. The next block to be input to the block processing pipeline 140 will be the fourth block in the first row.

H.264/Advanced Video Coding (AVC)

H.264/AVC (formally referred to as ITU-T Recommendation H.264, and also referred to as MPEG-4 Part 10) is a block-oriented motion-compensation-based codec standard developed by the ITU-T (International Telecommunications Union—Telecommunication Standardization Sector) Video Coding Experts Group (VCEG) together with the ISO/IEC JTC1 Moving Picture Experts Group (MPEG). The H.264/AVC standard is published by ITU-T in a document titled "ITU-T Recommendation H.264: Advanced video coding for generic audiovisual services". This document may also be referred to as the H.264 Recommendation.

SUMMARY OF EMBODIMENTS

Embodiments of block processing methods and apparatus are described in which a block processing pipeline includes multiple pipeline components, each of which performs one or more operations on a block of pixels from a video frame (or a representation thereof). In the video encoders described herein, blocks of pixels (e.g., macroblocks) from a video frame may be encoded in a block processing pipeline using wavefront ordering and context-adaptive variable-length coding (CAVLC). In wavefront ordering, rather than inputting blocks in scan order, blocks are input to the pipeline from subsequent rows in a row group so that adjacent blocks on a row are not concurrently at adjacent stages of the pipeline. For example, a context-adaptive variable-length coding component of the block processing pipeline may be configured to process the blocks of pixels according to knight's order such that each processed block is located in the frame one row down and at least one column to the left of the location of the block whose processing immediately preceded it.

In at least some embodiments, each of the CAVLC encoded blocks may be written to a particular one of multiple DMA buffers such that the encoded blocks written to each of the buffers represent consecutive blocks of the video frame in scan order. For example, the video encoder may include four DMA buffers into which encoded blocks may be written according to a pre-defined rotation order.

In at least some embodiments, the video encoders described herein may include a transcode pipeline that operates substantially in parallel with (or at least overlapping) the operation of the block processing pipeline. In some embodiments, once all of the blocks of pixels in a pre-defined portion of the frame (e.g., a portion of the frame containing four consecutive rows of blocks, i.e., a quadrow) have been encoded, the transcode pipeline may read the encoded blocks from the buffers in scan order and merge them into a single bit stream (again, in scan order). In some embodiments, the transcode pipeline may begin to read and process encoded blocks from a first row buffer in scan order as soon as a first block of the first row of the row group has been written to the buffer. However, the transcode pipeline cannot begin to read and process encoded blocks from a subsequent row until the last block of a current row has been read from the current row buffer. When operating in a transcode mode, the transcode pipeline may decode the encoded blocks, encode them using context-adaptive binary arithmetic coding (CABAC), and output a CABAC bit stream (e.g., writing it out to memory and/or providing it to another component of the video encoder). When operating in a bypass mode, a bit stream handler component of the transcode pipeline may output a CAVLC bit stream (e.g., writing it out to memory and/or providing it to another component of the video encoder).

In some embodiments, the block processing pipeline may not need to wait for the transcode pipeline to output the final bit stream (e.g., a CAVLC bit stream or a CABAC bit stream) before beginning to process (e.g., encode) additional blocks of pixels from the video frame (e.g., additional quadrows). Instead, the block processing pipeline may continue to receive and process additional blocks of pixels in knight's order (and to write the resulting encoded block information to the DMA buffers) while the transcoder operates on the data representing the encoded blocks of the previously processed quadrow.

BRIEF DESCRIPTION OF THE DRAWINGS

FIGS. 4A and 4B graphically illustrate the knight's order processing method including the algorithm for determining a next block, according to at least some embodiments.

Figure 1:
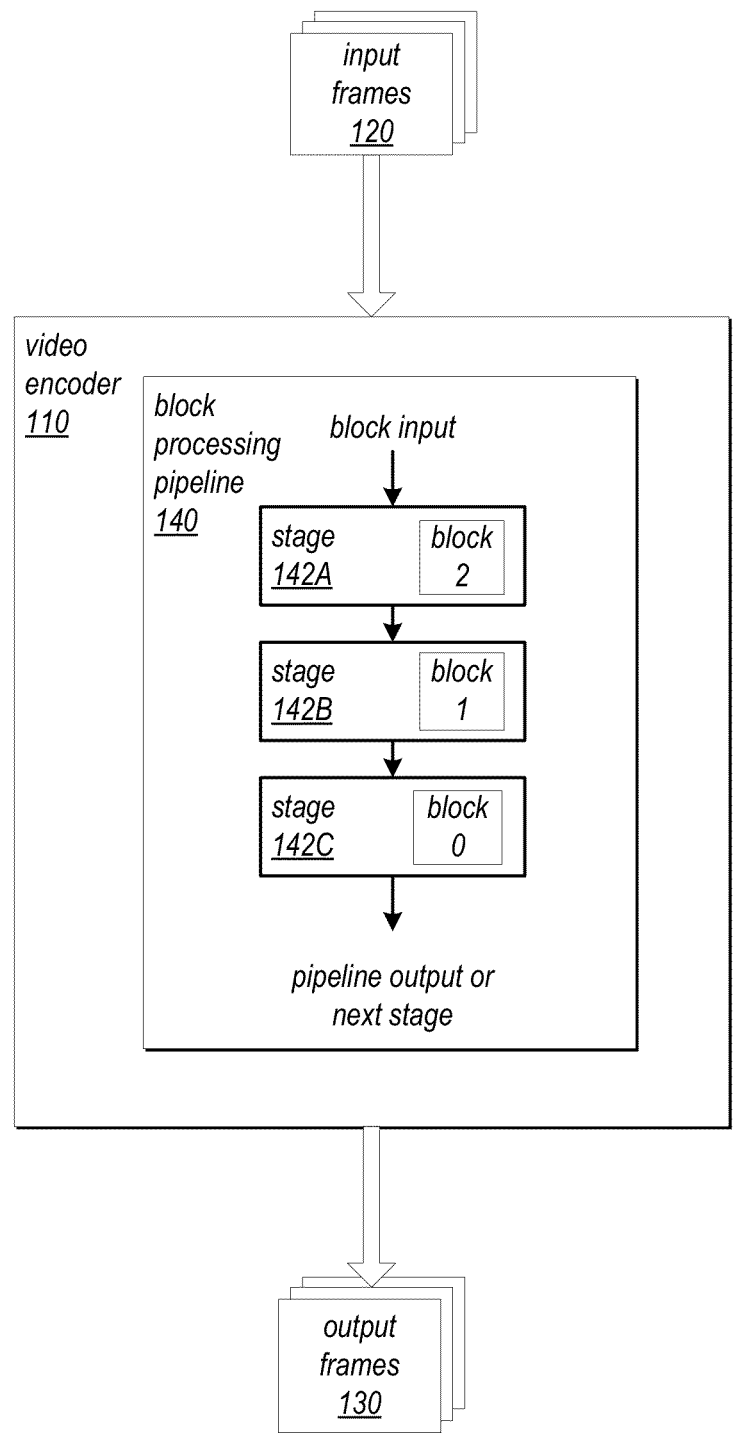
FIG. 1 illustrates an example video encoder including a conventional block processing pipeline that processes blocks from input frames in scan order.
Figure 2:
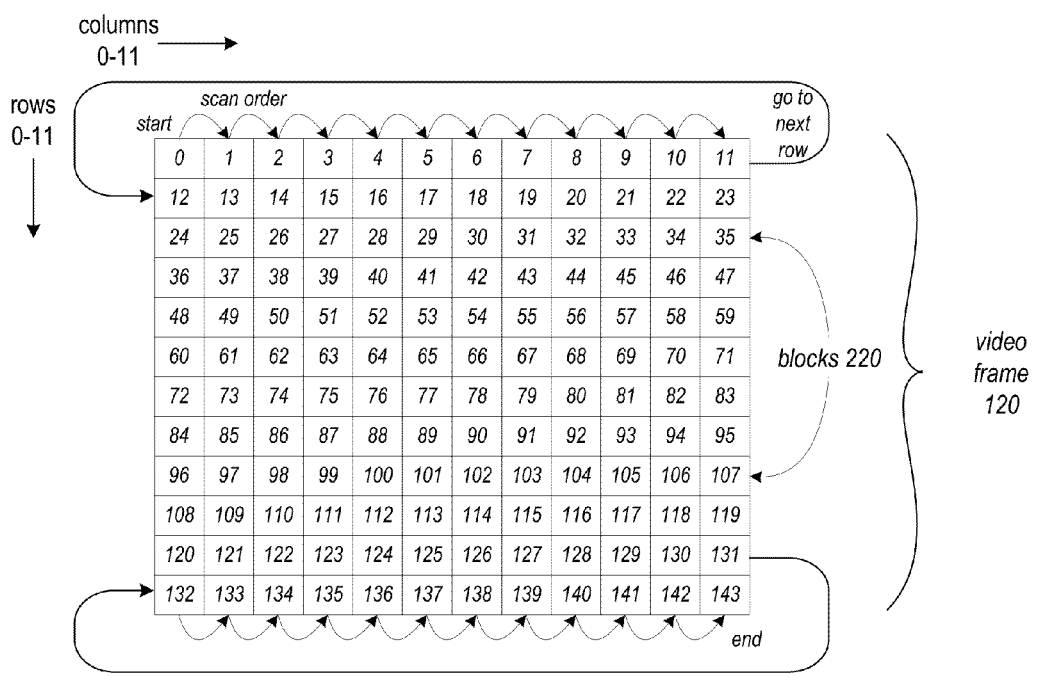
FIG. 2 illustrates conventional scan order processing of blocks from a video frame.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 10:
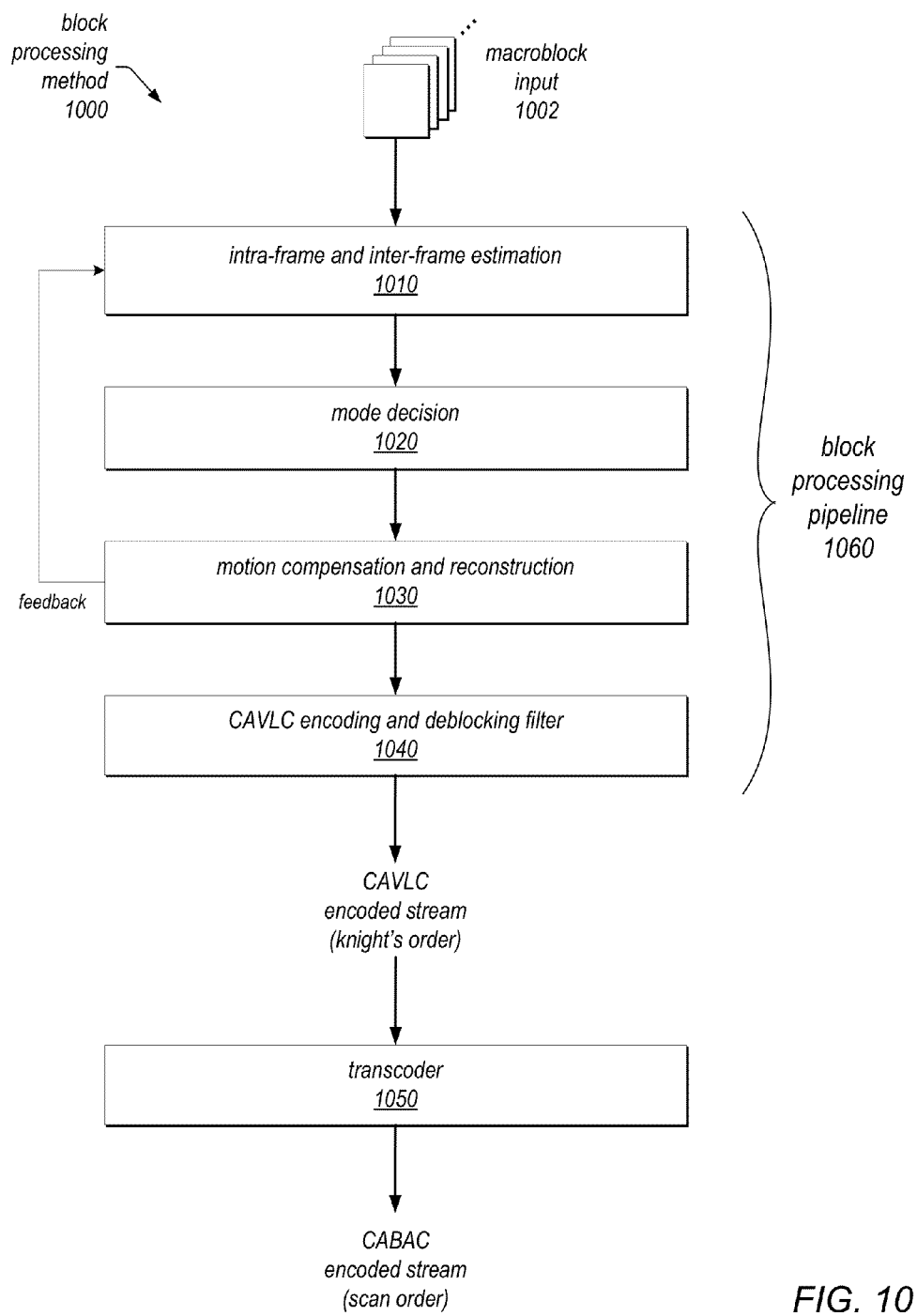
FIG. 10 is a high-level block diagram of general operations in an example block processing method that may be implemented by a block processing pipeline that implements one or more of the block processing methods and apparatus described herein, according to at least some embodiments.
Figure 17:
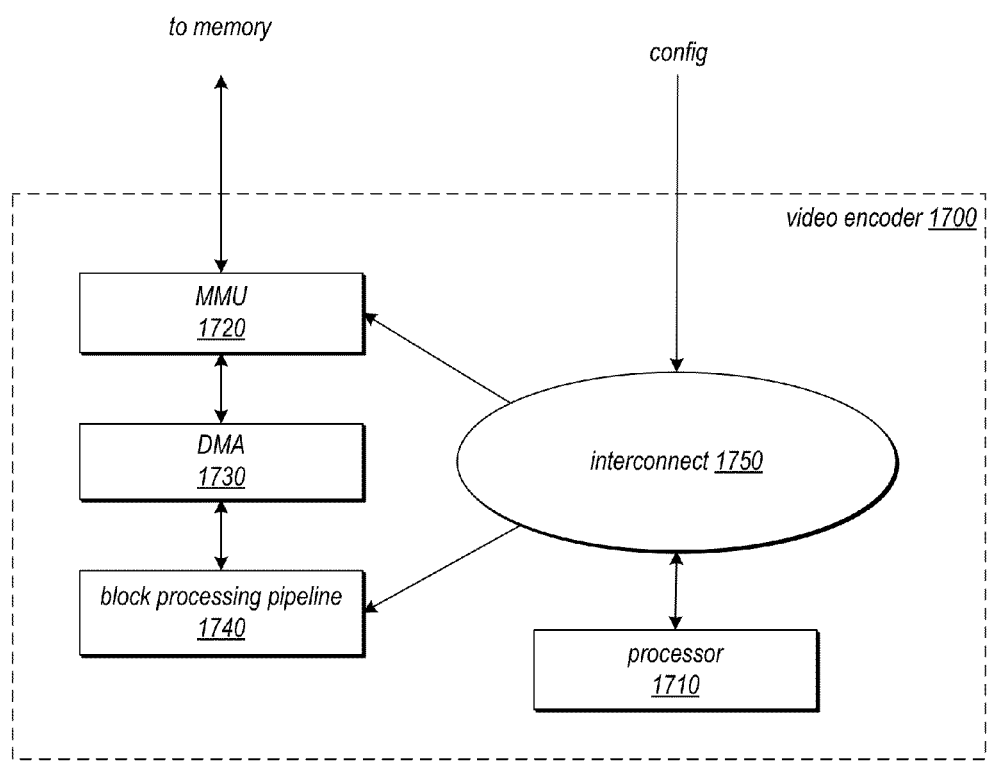
FIG. 17 is a block diagram illustrating an example video encoder apparatus, according to at least some embodiments.

Various embodiments of methods and apparatus for processing digital video frames in block processing pipelines are described. Embodiments of block processing methods and apparatus are generally described herein in the context of video processing in which input video frames are subdivided into and processed according to blocks of elements (e.g., 16×16, 32×32, or 64×64 pixel blocks). Embodiments of an example H.264 video encoder that includes a block processing pipeline and that may implement one or more of the block processing methods and apparatus are described herein. The H.264 video encoder converts input video frames from an input format into H.264/Advanced Video Coding (AVC) format as described in the H.264/AVC standard (the H.264 Recommendation). FIG. 10 illustrates an example block processing pipeline of an example H.264 video encoder, and FIG. 17 illustrates an example H.264 video encoder that includes a block processing pipeline. However, embodiments of the block processing methods and apparatus may be used in encoders for other video encoding formats, for example in block processing pipelines of HEVC (High Efficiency Video Encoding) video encoders that convert input video frames from an input format into HEVC format as described in the HEVC standard. Other video encoders that may use embodiments of the block processing methods and apparatus may include, but are not limited to, H.263, MPEG-2, MPEG-4, and JPEG-2000 video encoders. However, it is to be noted that embodiments of the block processing methods and apparatus may be used in any block processing pipeline, including but not limited to block processing pipelines implemented in various other video encoders and/or decoders (which may be referred to as codecs) in which digital video frames input in one format are encoded or converted into another format. Further note that the block processing methods and apparatus may be used in software and/or hardware implementations of video encoders. In addition to video encoders/decoders, the block processing methods and apparatus described herein may be used in various other applications in which blocks from a video frame or still digital image are processed, for example in pipelines that process still digital images in various image processing applications. Thus, it is to be understood that the term frame or video frame as used herein may also be taken to refer to any digital image.

Embodiments of the block processing methods and apparatus as described herein may be implemented in two or more parallel block processing pipelines. For example, 2, 4, 8, or more pipelines may be configured to run in parallel, with each pipeline processing a quadrow from an input video frame, for example with blocks input according to knight's order.

Embodiments of the block processing methods and apparatus are generally described herein in the context of video processing in which input frames are subdivided into and processed according to blocks of picture elements (referred to as pixels, or pels), specifically 16×16 pixel blocks referred to as macroblocks that are used, for example, in H.264 encoding. However, embodiments may be applied in pipelines in which blocks of other sizes and geometries, or of other elements, are processed. For example, HEVC encoding uses blocks referred to as Coding Tree Units (CTUs) that may vary within the range of 16×16 pixel to 64×64 pixel. In some implementations such as H.264 encoders, the blocks input to the pipeline may be referred to as macroblocks, each macroblock including two or more blocks or partitions that may be processed separately at stages of the pipeline. For example, for input video frames encoded in YUV (e.g., YUV420 format) or YCbCr (e.g., YCbCr 4:2:0, 4:2:2 or 4:4:4 formats) color space, a macroblock may be composed of separate blocks of chroma and luma elements that may be processed separately at stages in a pipeline. In addition to applications that process frames in a pipeline according to blocks of elements (e.g., blocks of pixels), the block processing methods and apparatus may be applied in applications in which digital images (e.g., video frames or still images) are processed by single elements (e.g., single pixels).

Knight's Order Processing

Embodiments of block processing methods and apparatus are described in which, rather than processing blocks in a pipeline according to scan order as in conventional methods, the blocks are input to and processed in the pipeline according to an order referred to herein as "knight's order." Knight's order is in reference to a move of a chess knight piece in which the knight moves one row down and two columns to the left. Note, however, that "knight's order" as used herein more generally encompasses movements of one row down and p columns to the left, where p may be but is not necessarily 2.

Figure 3:
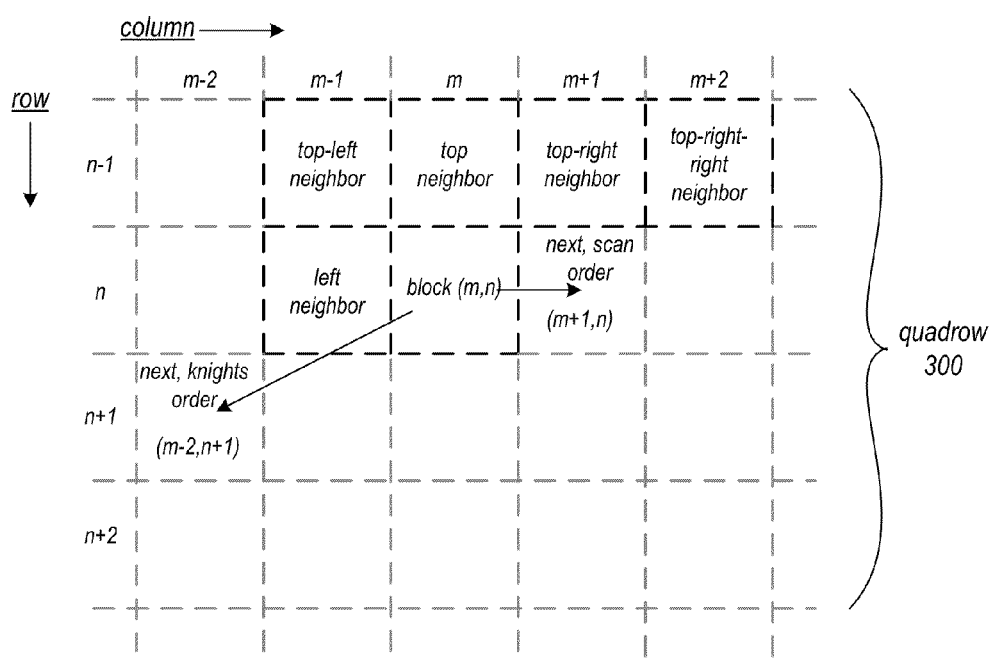
FIG. 3 illustrates neighbor blocks of a current block in a frame, and further illustrates a knight's order processing method for the blocks, according to at least some embodiments.

The knight's order processing method may provide spacing (one or more stages) between adjacent blocks in the pipeline, which, for example, facilitates feedback of data from a downstream stage of the pipeline processing a first block to an upstream stage of the pipeline processing a second block that depends on the data from the first block. One or more stages of a block processing pipeline may require information from one or more other neighbor blocks when processing a given block. FIG. 3 shows neighbors of a current block (m,n) from which information may be required—left (m−1,n); top (m,n−1); top-left (m−1,n−1); top-right (m+1,n−1); and top-right-right (m+2,n−1). These requirements for information from neighbor block(s) may be referred to as dependencies. For example, referring to FIG. 3, information from the left neighbor of block (m,n) may be required to perform a particular operation on the block. In the knight's order processing method, rather than inputting block (m+1, n) into the pipeline immediately after block (m,n), the next block input to the pipeline is block (m−2,n+1). Inputting the blocks into the pipeline in knight's order rather than scan order provides spacing (e.g., one or more stages) between adjacent blocks on a row in the pipeline.

In at least some embodiments of the knight's order processing method, the rows of blocks in the input frame may be divided into sets of four rows, referred to herein as quadrows, with the knight's order processing method constrained by the quadrow boundaries. Referring to FIG. 3 and quadrow 300, when using quadrow boundaries with knight's order processing block (m−1,n) will be four stages downstream when block (m,n) is input to the pipeline, and block (m,n) will be four stages downstream when block (m+1,n) is input to the pipeline. Thus, blocks that are adjacent on a row will be spaced four stages apart in the pipeline. Thus, at stages in which operations are performed on a block that depend on left neighbor information, the information for the left neighbor is more likely to be readily available with less latency than it would be if processing the blocks in scan order. In addition to dependencies on the left neighbor, one or more operations of a block processing method may depend on neighbor blocks from the previous (or above) row such as the top neighbor, top-left neighbor, top-right neighbor, and top-right-right neighbor blocks as shown in FIG. 3. The knight's order processing method with quadrow constraints provides locality of neighbor information that may be leveraged to provide local caching of this neighbor data at each stage in relatively small buffers.

In at least some embodiments, a basic algorithm for determining a next block to input to the pipeline according to the knight's order processing method using quadrow constraints is as follows:

If not on the bottom row of a quadrow:
The next block is two columns left, one row down (−2,+1).
Otherwise, at the bottom row of a quadrow:
The next block is seven columns right, three rows up (+7,−3).

However, the knight's order processing method may also be implemented with other spacing than two blocks left, one block down (−2,+1). For example, instead of two blocks left and one block down, the method may be implemented to go three blocks left and one block down to get the next block. As another example, the method may be implemented to go one block left and one block down (−1,+1) to get the next block. In addition, the knight's order processing method may be implemented with other row constraints than quadrow (four row) constraints. In other words, row groups of at least two rows may be used in embodiments to constrain the knight's order processing method. Assuming r as the number of rows used to constrain the knight's order processing method, the algorithm may be generalized as:

If not on the bottom row of a row group:
The next block is p columns left, one row down (−p,+1).
Otherwise, at the bottom row of a row group:
The next block is q columns right, (r−1) rows up (+q,−(r−1)).

Changing the value of p would affect the value of q, would not affect spacing between adjacent blocks from a row in the pipeline, but would affect spacing between a given block and its other neighbor blocks (e.g., its top-left, top, and top-right neighbors). In particular, note that using the spacing (−1,+1) would result in a block and its diagonal (top-right) neighbor block being concurrently processed at adjacent stages of the pipeline. Thus, a spacing of at least two blocks left may be used so that diagonally adjacent blocks are not concurrently processed at adjacent stages of the block processing pipeline. Changing the value of r would affect the value of q, would affect spacing between adjacent blocks from a row in the pipeline, and would affect spacing between the block and its other neighbor blocks (e.g., its top-left, top, and top-right neighbors).

The above algorithm for determining a next block may begin at an initial block. Upon reaching the end of a quadrow that is followed by another quadrow, the algorithm jumps to the first block of the next quadrow and then crosses over between the quadrow and the next quadrow for a few cycles, resulting in the interleaving of some blocks from the end of the quadrow with some blocks from the beginning of the next quadrow. In other words, the knight's order processing method treats the quadrows as if they were arranged end to end. To avoid complications in the algorithm and to maintain consistent spacing of blocks in the pipeline, at least some embodiments may pad the beginning of the first quadrow and the end of the last quadrow with invalid blocks. An invalid block may be defined as a block that is outside the boundary of the frame and that is input to the pipeline but that does not contain valid frame data, and thus is not processed at the stages. The algorithm for determining a next block may thus begin at an initial block, which may be either the first block in the top row of the first quadrow or an invalid block to the left of the first block in the top row of the first quadrow, proceed through all of the quadrows, and at the end of the last quadrow continue until the last block of the last quadrow has been input to the pipeline. There will be bubbles in the pipeline at the beginning and end of the frame, but the spacing of the valid blocks from the frame in the pipeline will remain consistent throughout. In some embodiments, as an alternative to padding the end of the last quadrow of a video frame with invalid blocks, the last quadrow of a video frame may be overlapped with the first row of the next video frame to be processed in the block processing pipeline.

FIGS. 4A and 4B graphically illustrate the knight's order processing method, according to at least some embodiments. For simplicity, these Figures use an example 192×192 pixel frame 400 divided into 144 16×16 pixel blocks, with 12 rows and 12 columns of blocks. However, it is to be noted that the knight's order processing method can be applied to input video frames of any dimensions. In FIG. 4A, an example frame is divided into rows and columns of blocks. The rows of blocks are partitioned into three quadrows (410, 420, and 430) including four rows each. The last three rows of the first quadrow (410) are padded on the left with invalid blocks, and the first three rows of the last (third) quadrow (430) are padded on the right with invalid blocks. In this example, the numbers in the blocks represent the order in which the blocks are input to the block processing pipeline according to the knight's order processing method, beginning with block 0 (the first block in the top row of the first quadrow). Block 0 is input to the first stage of the pipeline, and when the first stage is ready for another block, the method proceeds by going two columns left, one row down to get the next block for input (block 1, in FIG. 4A). This pattern is repeated until reaching the bottom of the quadrow. At the bottom of the quadrow, the method goes seven columns right, three rows up to get the next block. This continues until all of the blocks in the frame (as well as all of the invalid blocks shown in FIG. 4A) are input into the pipeline. When the end of a quadrow is reached, if there is another quadrow after the quadrow the input algorithm proceeds to the beginning of the next quadrow. In this example, after block 47 is input, the method proceeds to block 48 (the first block in the top row of the second quadrow). As shown by the dashed arrow from block 47 to the dashed rectangle labeled 48 to the right of block 44, the first block of the top row of the second quadrow (block 48) is treated as being immediately to the right of the last block of the top row of the first quadrow (block 44), and thus is reached from block 47 by going seven columns right, three columns up. In other words, the knight's order processing method treats the quadrows 410, 420, and 430 as if they were arranged end to end, with invalid blocks at each end, as shown in FIG. 4B. Thus, the algorithm for determining a next block remains the same across the entire frame 400.

In some embodiments, each row of the first quadrow may be padded with extra invalid blocks, for example with two extra invalid blocks. Instead of beginning with the first block in the top row of the first quadrow as shown in FIG. 4A, input to the pipeline may begin with the first invalid block to the left of the first block in top row of the first quadrow.

Figure 5A:
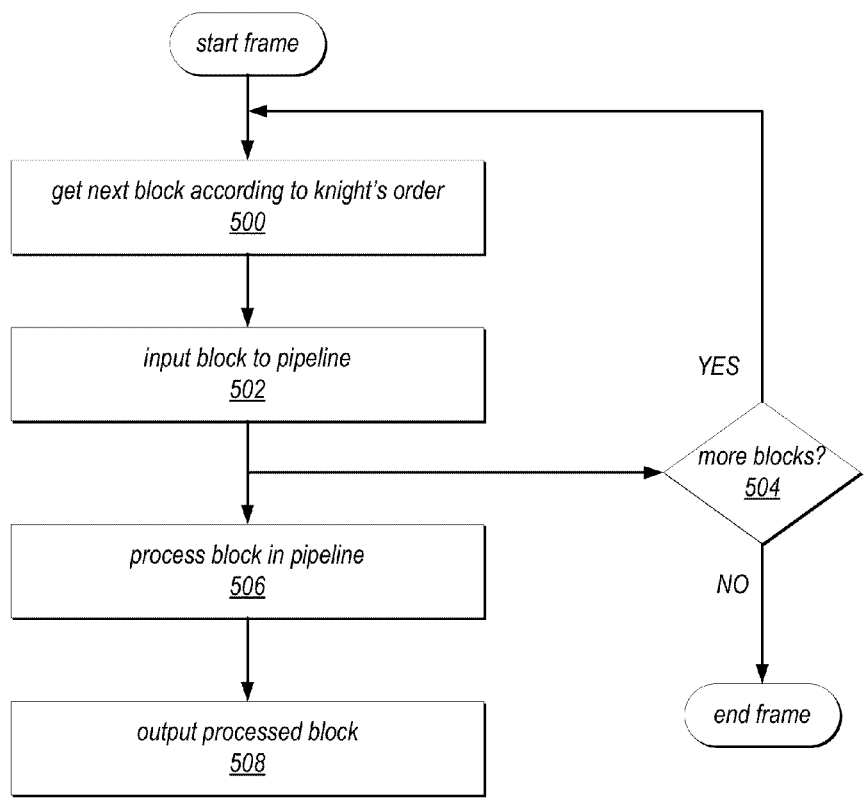
FIGS. 5A and 5B are high-level flowcharts of a knight's order processing method for a block processing pipeline, according to at least some embodiments.
Figure 5B:
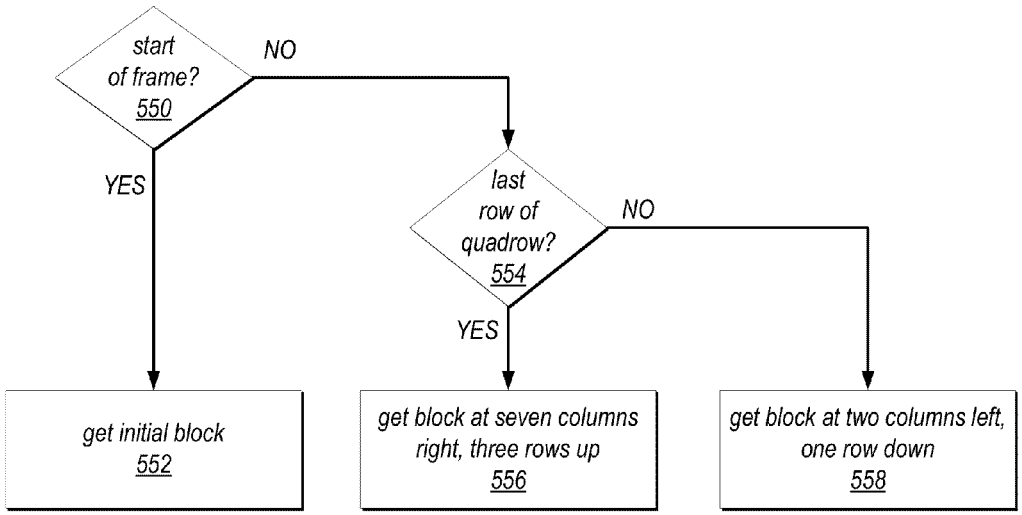

FIGS. 5A and 5B are high-level flowcharts of a knight's order processing method for a block processing pipeline, according to at least some embodiments. In FIG. 5A, as indicated at 500, a next block is determined according to the algorithm for determining a next input block that is implemented by the knight's order processing method. As indicated at 502, the block is input to the pipeline, for example from a memory via direct memory access (DMA). As shown by 504, the input process of elements 500 and 502 continues as long as there are blocks to be processed. Each block that is input to the pipeline by elements 500 and 502 is processed in the pipeline, as indicated at 506. Each block is initially input to a first stage of the pipeline, processed, output to a second stage, processed, and so on. When a block moves from a stage to a next stage of the pipeline, the stage can begin processing the next block in the pipeline. Thus, the input blocks move through the stages of the pipeline, with each stage processing one block at a time. As indicated at 508, once a block has been processed by a last stage of the pipeline, the processed block is output, for example to a memory via direct memory access (DMA).

FIG. 5B is a flowchart of an example algorithm for determining a next input block may be implemented by the knight's order processing method, and expands on element 500 of FIG. 5A. FIG. 5B assumes that the frame is divided into quadrows, and that the algorithm used to determine the next frame is two columns left, one row down (−2,+1) if not on the bottom row of a quadrow, seven columns right, three rows up (+7,−3) if on the bottom row. However, other row groupings and/or spacing algorithms may be used. At 550, if at the start of the frame, the method gets an initial block as indicated at 552. If this is not the start of the frame, then at 554, if this is the last row of the quadrow, the next block is seven columns right, three rows up, as indicated at 556. If this is not the last row of the quadrow, the next block is two columns left, one row down, as indicated at 558.

Caching Neighbor Data

One or more operations performed at stages of a block processing pipeline may depend on one or more of the neighbor blocks from the previous (or above) row of blocks such as the top neighbor, top-left neighbor, top-right neighbor, and top-right-right neighbor blocks, as well as on the left neighbor, as shown in FIG. 3. The knight's order processing method with quadrow constraints provides locality of neighbor information that may be leveraged to provide local caching of neighbor data at each stage of the pipeline in relatively small local buffers. For example, in some embodiments, the cached neighbor data may include source transform coefficients (e.g., DC transform coefficients), modified transform coefficients, previously computed quantization errors, and/or weighting coefficient values for one or more neighbor pixels. In at least some embodiments, the local buffers may be implemented using SRAM (static random access memory) technology. However, the local buffers may be implemented using other memory technologies in some embodiments.

Note that blocks in the first column of a frame do not have a left or top-left neighbor, blocks in the last column do not have a top-right or top-right-right neighbor, and blocks in the next-to-last column do not have a top-right-right neighbor. Thus, for block processing methods that use information from these neighbor positions, the information in the local buffers for these neighbor positions relative to blocks in those columns is not valid and is not used in processing the blocks in those columns in the stages of the pipeline. In addition, there are no rows above the top row of the first quadrow, so the blocks in this row do not have top, top-left, top-right, and top-right-right neighbors.

In at least some embodiments of a block processing pipeline that implements the knight's order processing method, a first buffer of sufficient size to cache the C most recently processed blocks on the current quadrow may be implemented at each of one or more stages of the pipeline. This buffer may be referred to as the current quadrow buffer, and may, for example, be implemented as a circular FIFO buffer. In at least some embodiments, C may be determined such that the buffer includes an entry corresponding to the top-left neighbor of the current block at the stage according to the algorithm for determining a next block and the row group size used to constrain the knight's order method. The buffer may also include entries corresponding the top-right-right, left, top-right, and top neighbors for the current block according to the algorithm. When processing a block, a stage may access the current quadrow buffer to obtain neighbor information for the block if that block's neighbor information is valid in the current quadrow buffer. Note that some block processing methods may not require top-left neighbor information, and the current quadrow buffer may be smaller in these implementations.

When a stage completes processing of a block, the block's information is written to the last position in the current quadrow buffer, overwriting the entry at the position of the block's top-left neighbor, thus preparing the buffer for the next block to be processed at the stage. Note that, initially, at the beginning of a frame, there is no information in the current quadrow buffer as no blocks in the frame have been processed, so no block information will be overwritten in the buffer until the buffer is filled. When the next block is at the stage, the previous block's information in the buffer is the block's top-right-right neighbor information.

Figure 6:
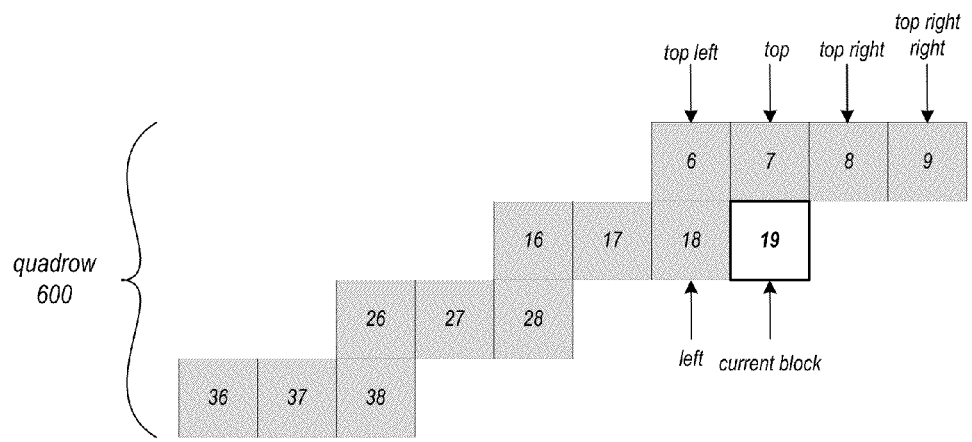
FIG. 6 illustrates a portion of a quadrow as processed in a pipeline according to the knight's order processing method that may be cached in the current quadrow buffer, according to at least some embodiments FIG. 7 graphically illustrates blocks in a current quadrow being processed according to the knight's order processing method, as well as neighbor blocks in the last row of the previous quadrow that may be cached in a previous quadrow buffer, according to at least some embodiments.

For example, using quadrow boundaries and the algorithm for determining a next block where the next block is two columns left, one row down if not on the bottom row of a quadrow, C=13 would be sufficient to include the top-left neighbor of the current block, as the spacing between the current block and its top-left neighbor is 13. FIG. 6 shows a portion of a quadrow 600 as processed in a pipeline according to the knight's order processing method that may be cached in the current quadrow buffer, according to at least some embodiments. Block 19 represents a current block at a stage. The shaded blocks represent the 13 most recently processed blocks by the stage. Note that the farthest block from block 19 in time is its top-left neighbor (block 6), and the nearest block in time is its top-right-right neighbor (block 9).

For the blocks in the top row of a quadrow, information for neighbors in the row above is not in the current quadrow buffer. There are no rows above the top row of the first quadrow, and for all other quadrows the row above the top row is the bottom row of the previous quadrow. Thus, the current quadrow buffer includes the left neighbor information for all blocks in the top row of a quadrow (except for the first block, which has no left neighbor), but does not include the top-left, top, top-right, and top-right-right neighbor information for the blocks in the top row of the quadrow. To provide this neighbor information for blocks on the top rows of the quadrows, a second buffer of sufficient size to hold information for the required neighbor blocks from the last row of the previous quadrow may be implemented at one or more stages of the pipeline. This buffer may be referred to as the previous quadrow buffer, and may, for example, be implemented as a circular FIFO buffer. The number of entries in the previous quadrow buffer, as well as the particular neighbor blocks that are cached in the previous quadrow buffer, may be dependent on the requirements of the particular block processing method that is implemented by the block processing pipeline. In at least some embodiments, when processing a quadrow according to the knight's order processing method, information for each block on the bottom row of the quadrow may be written to an external memory, for example when the block is at a last stage of the pipeline. For each block in the top row of a quadrow, neighbor (e.g., top-right-right neighbor) data may be read from the external memory, for example at a first stage of the pipeline. This neighbor information may be passed down the pipeline to the other stages along with the corresponding block from the top row.

Figure 7:
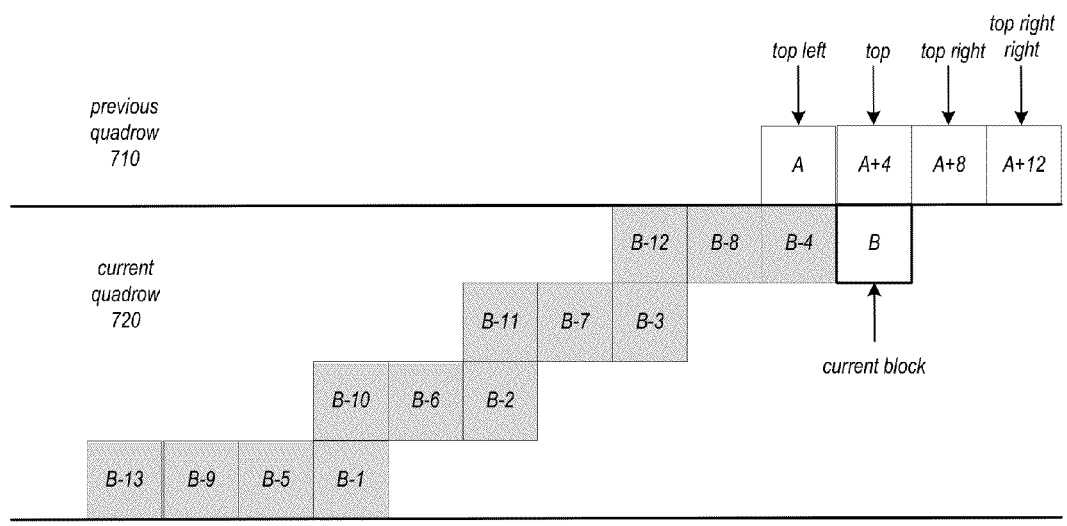

FIG. 7 graphically illustrates blocks in a current quadrow 720 being processed according to the knight's order processing method, as well as neighbor blocks in the last row of the previous quadrow 710, according to at least some embodiments. Blocks A, A+4, A+8, and A+12 were processed on the previous quadrow according to the knight's order processing method. Block A was processed first, block A+4 was processed four cycles later, and so on. Block B represents a block on the current quadrow that is currently at a particular stage of the pipeline. Blocks B−1 (B minus 1) through B−13 (B minus 13) represent the thirteen blocks that were most recently processed at the stage in the current quadrow. Information from these blocks may be presently cached in the stage's current quadrow buffer, with B−1 as the most recent entry and B−13 as the oldest entry. B−4 is current block B's left neighbor. However, block B's top-left (block A), top (block A+4), top-right (block A+8), and top-right-right (block A+12) neighbors are on the bottom row of the previous quadrow, and are not included in the current quadrow buffer for block B. In at least some embodiments, to provide neighbor information for blocks on the top row of the current quadrow (e.g., top-left, top, top-right, and top-right-right neighbor information), a previous quadrow buffer may be implemented at each of one or more stages of the pipeline. When processing a quadrow, information for each block on the bottom row of the quadrow is written to a neighbor data structure in external memory, for example by a last stage of the pipeline. When processing blocks from the top row of a next quadrow, information for neighbor blocks in the bottom row of the previous quadrow is read from the external memory, for example by a first stage of the pipeline, and passed down the pipeline to other stages with the top row blocks. In at least some embodiments, information for the top-right-right neighbor block of a block in the top row is read from the external memory. In at least some embodiments, the previous quadrow buffer is a circular buffer, and an oldest entry in the previous quadrow buffer is replaced with the neighbor information that is read from the external memory. In various embodiments, the external memory to which blocks in the bottom row are written and from which neighbor block information is read may be a memory of the pipeline component that is external to the last stage, a memory of a video encoder that implements the pipeline, or a memory external to the video encoder. In some embodiments, however, the memory may be a local memory of the last stage of the pipeline. At least some embodiments may include an interlock mechanism to control the reads and writes to the external memory between rows to avoid overwriting the data in external memory.

Figure 8:
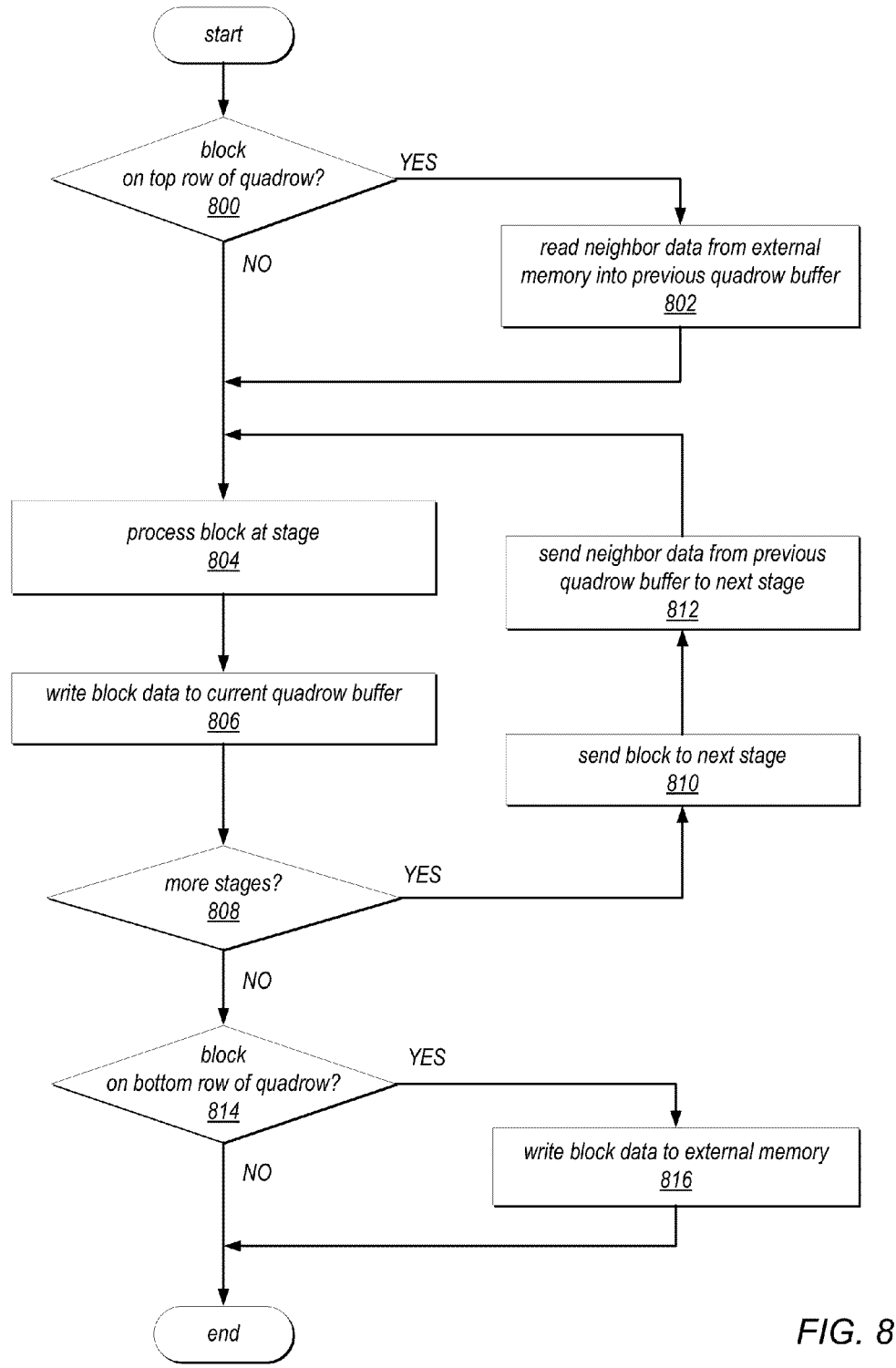
FIG. 8 is a flow diagram illustrating a method for processing blocks in a block processing pipeline in which neighbor data is cached in local buffers at the stages of the pipeline, according to at least some embodiments.

FIG. 8 is a flow diagram illustrating a method for processing blocks in a block processing pipeline in which neighbor data is cached in local buffers at the stages of the pipeline, according to at least some embodiments. For example, the method of FIG. 8 may be used at element 506 of FIG. 5A to process blocks input to the pipeline according to the knight's order processing method as shown at elements 500, 502, and 504 of FIG. 5A. In FIG. 8, a block is input to the pipeline. At 800, at a first stage of the pipeline, if the block is on the top row of a quadrow, then neighbor data for the block may be read from external memory (for example, via DMA) into a previous quadrow buffer as indicated at 802. In at least some embodiments, the neighbor data corresponds to the top-right-right neighbor of the current block on the bottom row of the previous quadrow. As indicated at 804, the block is then processed at the current stage. If an operation at the stage requires neighbor information to process the block, the stage may use the neighbor information in the current quadrow buffer and/or in the previous quadrow buffer to perform the operation. If the block is on the top row of a quadrow, then at least some of the neighbor information is obtained from the previous quadrow buffer; otherwise, neighbor information may be obtained from the current quadrow buffer. As indicated at 806, information about the current block may be written to the current quadrow buffer at the stage for use on subsequent blocks. The information may overwrite an oldest entry in the current quadrow buffer.

At 808, if there are more stages, then the block may be sent to a next stage, as indicated at 810. At 812, neighbor information from the previous quadrow buffer may also be sent to the next stage. In at least some embodiments, this neighbor information is only sent to the next stage if the current block is on the top row of a quadrow. Elements 804 through 812 may be repeated until the block reaches and is processed by a last stage of the pipeline. At 808, if there are no more stages, then processing of the block in the pipeline is done. At 814, if the block is on the bottom row of a quadrow, then information for the block is written to an external memory (for example, via DMA) to be read as neighbor data for blocks in the top row of a next quadrow. In addition, all of the processed valid blocks are output as shown by element 508 of FIG. 5A.

Example Pipeline Units

Figure 9A:
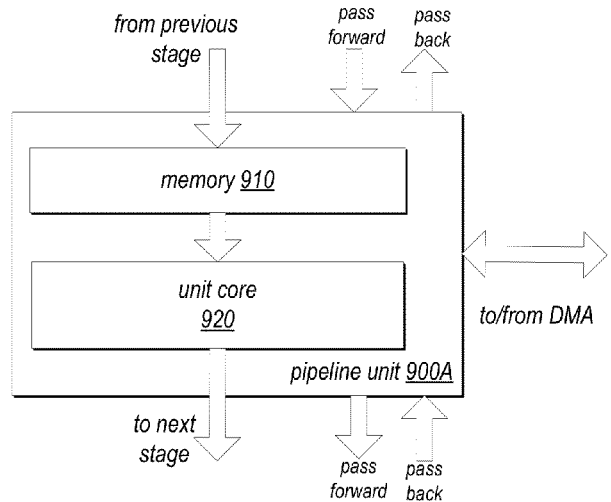
FIGS. 9A and 9B are block diagrams of example pipeline processing units that may be used at the stages of a block processing pipeline that implements one or more of the block processing methods and apparatus as described herein, according to at least some embodiments.
Figure 9B:
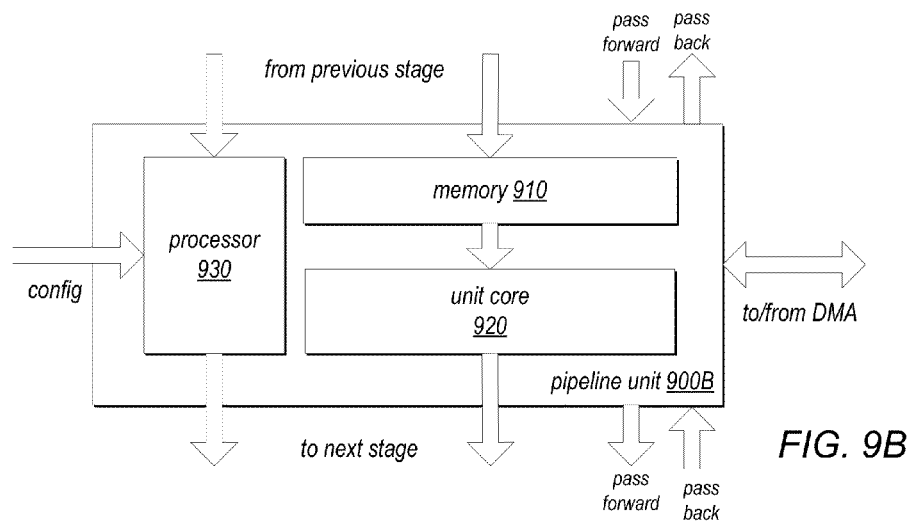
Figure 9C:
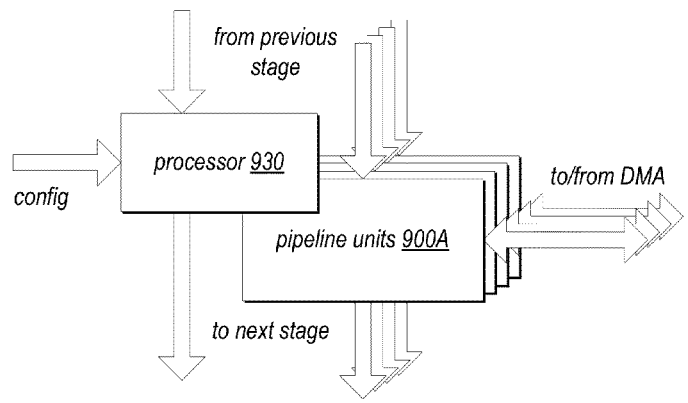
FIG. 9C illustrates that a single processor may be associated with a group of two or more pipeline units, according to at least some embodiments.

FIGS. 9A through 9C are block diagrams of example pipeline processing units that may be used at the stages of a block processing pipeline that implements one or more of the block processing methods and apparatus as described herein, according to at least some embodiments. For example, one or more of pipeline units 900A and/or 900B as shown in FIGS. 9A and 9B may be used at each stage of the example block processing pipeline shown in FIG. 10. Note that FIGS. 9A through 9C are not intended to be limiting; a pipeline processing unit may include more or fewer components and features than those shown in the Figures.

As shown in FIG. 9A, a pipeline unit 900A may include at least a memory 910 and a unit core 920. Unit core 920 may be a component (e.g., a circuit) that is configured to perform a particular operation on or for a block, or a portion of a block, at a particular stage of the block processing pipeline. Memory 910 may, for example, be a double-buffered memory that allows the unit core 920 to read and process data for a block from the memory 910 while data for a next block is being written to the memory 910 from a previous pipeline unit.

As shown in FIG. 9B, a pipeline unit 900B, in addition to a memory 910 and unit core 920 as shown in FIG. 9A, may also include a processor 930. Processor 930 may, for example, be a mobile or M-class processor. The processors 930 in pipeline units 900B of a block processing pipeline may, for example, be used to control the block processing pipeline at block boundaries. The processors 930 in pipeline units 900B may be configurable, for example with low-level firmware microcode, to allow flexibility in algorithms that are implemented by the block processing pipeline for various applications. In at least some embodiments, a processor 930 of a pipeline unit 900B in the pipeline may be configured to receive data from a processor 930 of a previous (upstream) pipeline unit 900B and send data to a processor 930 of a subsequent (downstream) pipeline unit 900B. In addition, a processor 930 of a pipeline unit 900B at a last stage of the pipeline may be configured to send feedback data to a processor 930 of a pipeline unit 900B at a first stage of the pipeline.

As shown in FIGS. 9A and 9B, a pipeline unit 900A or 900B may be configured to access external memory, for example according to direct memory access (DMA). In addition, a pipeline unit 900A or 900B may be configured to pass information back to one or more previous (upstream) stages of the pipeline and/or to receive information passed back from one or more subsequent (downstream) stages of the pipeline. In addition, a pipeline unit 900A or 900B may be configured to pass information forward to one or more subsequent (downstream) stages of the pipeline and/or to receive information passed forward from one or more previous (upstream) stages of the pipeline.

As shown in FIG. 9C, two or more units 900A as shown in FIG. 9A may be grouped together and configured to perform an operation in the pipeline. A single processor 930 may be used to control and/or configure the pipeline units 900A.

Example Block Processing Pipeline

FIG. 10 is a high-level block diagram of general operations in an example block processing method 1000 for H.264 encoding that may be implemented in stages by a block processing pipeline that may implement one or more of the block processing methods and apparatus as described herein, according to at least some embodiments. A block processing pipeline that implements the block processing method 1000 may, for example, be implemented as a component of an H.264 video encoder apparatus that is configured to convert input video frames from an input format into H.264/Advanced Video Coding (AVC) format as described in the H.264/AVC standard. The H.264/AVC standard is published by ITU-T in a document titled "ITU-T Recommendation H.264: Advanced video coding for generic audiovisual services", which may be referred to as the H.264 Recommendation. An example input video format is 1080p (1920×1080 pixels, 2.1 megapixels) encoded in YCbCr color space. However, other input video formats may be encoded into H.264 using embodiments of the pipeline in a video encoder apparatus.

Figure 18:
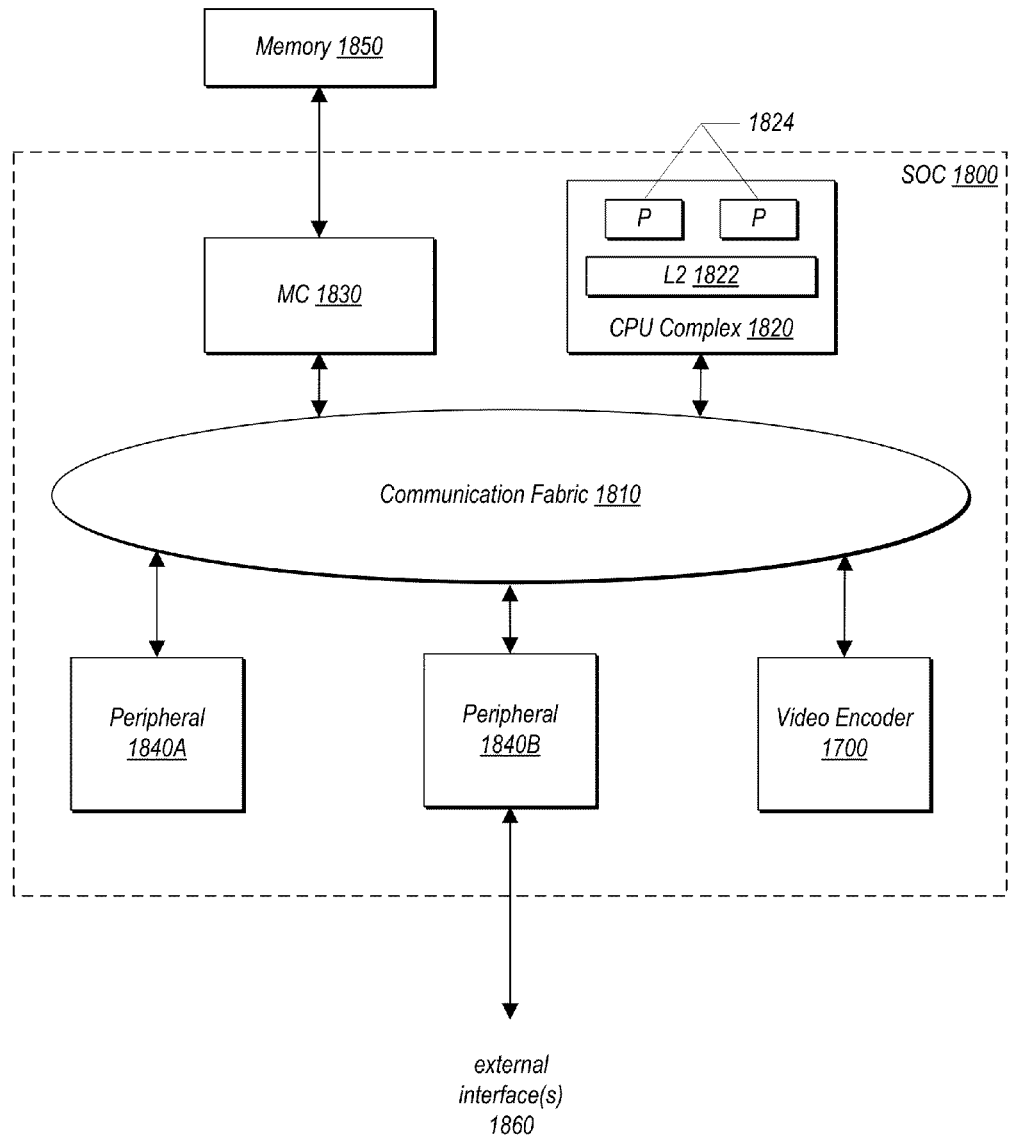
FIG. 18 is a block diagram illustrating one embodiment of a system on a chip (SOC) that includes a video encoder.

The video encoder apparatus may, for example, be implemented as an integrated circuit (IC) or as a subsystem on an IC such as a system-on-a-chip (SOC). In at least some embodiments, the video encoder apparatus may include at least a pipeline component, a processor component (e.g., a low-power multicore processor), and a bus subsystem or fabric that interconnects the functional components of the apparatus. The processor component of the video encoder apparatus may, for example, perform frame-level control of the pipeline such as rate control, perform pipeline configuration, and interface with application software via a driver. The pipeline component may implement multiple processing stages each configured to perform a portion or all of one or more of the operations as shown in FIG. 10, each stage including one or more processing units. At least one of the processing units in the pipeline may include a processor component (e.g., an M-class processor) that may, for example, configure parameters of the processing unit at the respective stage at the macroblock level. The video encoder apparatus may include other functional components or units such as memory components, as well as external interfaces to, for example, one or more video input sources and external memory. Example video input sources to the video encoder apparatus may include one or more of, but are not limited to, a video camera for raw video input processing, a decoder apparatus for re-encoding/transcoding, a flash or other memory, and a JPEG decoder. An example video encoder apparatus is illustrated in FIG. 17. An example SOC that includes a video encoder apparatus is illustrated in FIG. 18. While embodiments are generally described in relation to hardware implementations of a block processing pipeline that implements the block processing method 1000 with knight's order processing, note that the block processing method 1000 with knight's order processing may be implemented by a block processing pipeline implemented in software.

A pipeline that implements the method 1000 as shown in FIG. 10 may process 16×16 pixel macroblocks from input video frames according to the H.264 standard, each macroblock including two or more blocks or partitions that may be processed separately at stages of the pipeline. The input video frames may, for example, be encoded in YCbCr color space; each macroblock may be composed of separate blocks of chroma and luma elements that may be processed separately at the stages of the pipeline. A pipeline that implements the block processing method 1000 may receive input macroblocks from and output processed macroblocks to a memory. The memory may include memory of the video encoder apparatus and/or memory external to the video encoder apparatus. In at least some embodiments, the memory may be accessed by the pipeline as necessary, for example via direct memory access (DMA). In at least some embodiments, the memory may be implemented as a multi-level memory with a cache memory implemented between the pipeline and an external memory. For example, in some implementations, one or more quadrows may be read from an external memory and cached to the cache memory for access by the pipeline to reduce the number of reads to an external memory.

The general operations of the example H.264 video encoder method 1000 as shown in FIG. 10 that may be performed in stages by a pipeline, as well as general data flow through the pipeline, are briefly described below. Each of the general operations of the method 1000 may be implemented by one or more pipeline units at one or more stages of the pipeline. Example pipeline units are illustrated in FIGS. 9A through 9C. Also note that each general operation shown in FIG. 10 may be subdivided into two or more operations that may be implemented by pipeline units at one, two, or more stages of the pipeline. However, two or more of the operations shown in FIG. 10 may be performed at the same stage of the pipeline. Each stage in the pipeline processes one macroblock at a time, and thus two or more of the operations may simultaneously operate on the same macroblock that is currently at the respective stage. Note that a pipeline may perform more, fewer, or other operations than those shown in FIG. 10 and described below.

Macroblock Input

In at least some embodiments, macroblock input 1002 may be performed by an initial stage of the pipeline. In at least some embodiments, macroblock input 1002 receives luma and chroma pixels from a memory, for example via DMA, computes statistics on input pixels that are used by firmware in downstream stages of the pipeline, and buffers input macroblocks to enable firmware look ahead. The input macroblock pixel data and corresponding statistics are buffered and sent to one or more downstream stages of the pipeline that implement intra-frame and inter-frame estimation 1010 operations. In at least some embodiments, an input buffer of up to 16 macroblocks is maintained for input pixels and statistics. In at least some embodiments, the macroblock pixel data and corresponding statistics may be input to downstream stages of the pipeline according to a knight's order input algorithm as previously described in the section titled Knight's order processing.

In at least some embodiments, macroblock input 1002 reads neighbor data from the bottom row of a previous quadrow from memory at quadrow boundaries and passes the neighbor data to at least one downstream stage.

Intra-Frame and Inter-Frame Estimation

Intra-frame and inter-frame estimation 1010 operations may determine blocks of previously encoded pixels to be used in encoding macroblocks input to the pipeline. In H.264 video encoding, each macroblock can be encoded using blocks of pixels that are already encoded within the current frame. The process of determining these blocks may be referred to as intra-frame estimation, or simply intra-estimation. However, macroblocks may also be encoded using blocks of pixels from one or more previously encoded frames (referred to as reference frames). The process of finding matching pixel blocks in reference frames may be referred to as inter-frame estimation, or more generally as motion estimation. Intra-frame and inter-frame estimation 1010 operations may be subdivided into two or more sub-operations that may be performed at one, two, or more stages of the pipeline, with one or more components or pipeline units at each stage configured to perform a particular sub-operation.

In at least some embodiments, macroblock input 1002 reads neighbor data from the bottom row of a previous quadrow from memory at quadrow boundaries and passes the neighbor data to intra-frame and inter-frame estimation 1010, for example to an intra-frame estimation component. In addition, motion compensation and reconstruction 1030, for example a luma reconstruction component, may pass neighbor data as feedback to intra-frame and inter-frame estimation 1010, for example to the intra-frame estimation component.

Motion Estimation

In at least some embodiments, to perform motion estimation, the pipeline may include one instance of a motion estimation engine for each reference frame to be searched. Each motion estimation engine searches only one reference frame. In at least some embodiments, each motion estimation engine may include a low resolution motion estimation component, a full pixel motion estimation component, and a subpixel motion estimation component. In at least some embodiments, the three components of each of the motion estimation engines may be implemented at different stages of the pipeline. In at least some embodiments, each motion estimation engine may also include a memory component that reads and stores reference frame data from a memory as needed. In at least some embodiments, a single instance of a processor manages all instances of the motion estimation engine. In at least some embodiments, the processor may determine one or more candidates using predicted and co-located motion vectors and input the candidates to the full pixel motion estimation components of the motion estimation engines.

In at least some embodiments, the low resolution motion estimation component of each motion estimation engine performs an exhaustive search on a scaled-down, low resolution version of a respective reference frame to generate candidates. In at least some embodiments, the full pixel motion estimation component performs a search on full size pixels using candidates from the low resolution motion estimation component. In at least some embodiments, the subpixel motion estimation component performs a search on half and quarter pixels using best candidates received from the full pixel motion estimation component. In some embodiments, full pixel motion estimation and subpixel motion estimation may be disabled based on results of a direct mode estimation performed at an upstream stage of the pipeline. In at least some embodiments, each motion estimation engine outputs results data to mode decision 1020.

In at least some embodiments, motion estimation may also include a direct mode estimation component that receives co-located and spatial motion vector data and computes a direct/skip mode cost, which it provides to mode decision 1020. Based on the results, the direct mode estimation component may disable full pixel motion estimation and subpixel motion estimation.

Intra Estimation

In at least some embodiments, an intra estimation component of the pipeline performs intra mode selection to determine blocks of pixels already encoded within the current frame that may be used in encoding a current macroblock. In at least some embodiments, the intra estimation component performs intra mode selection only for luma. In these embodiments, Chroma intra estimation is performed by a chroma reconstruction component at a downstream stage of the pipeline. In at least some embodiments, the intra estimation component may perform intra estimation independently for each of two or more blocks or partitions (e.g., 4×4, 8×8, 4×8, 8×4, 16×8, and/or 8×16 blocks) in a macroblock. For each block, prediction pixels are first extracted from neighbor blocks (neighbor blocks can be outside the current macroblock in the frame or within the current macroblock). For each prediction mode in the current block, the cost of the current mode is evaluated by creating a prediction block from neighbor pixels, computing a mode cost, and comparing the mode cost to a minimum cost for that block. Once all prediction modes are evaluated and the best mode is determined, reconstruction may be performed for the best mode so that reconstructed pixels can be used to predict future blocks within the macroblock. The intra estimation component may pass best intra mode information to mode decision 1020.

In at least some embodiments, macroblock input 1002 reads neighbor data from the bottom row of a previous quadrow from memory at quadrow boundaries and passes the neighbor data to the intra estimation component. In at least some embodiments, at least one downstream stage (e.g., a luma reconstruction component at a downstream stage) may pass neighbor data back to the intra estimation component.

Mode Decision

In at least some embodiments, mode decision 1020 may be implemented by a mode decision component at a stage of the pipeline that is downstream of the stage(s) that implement intra-frame and inter-frame estimation 1010 operations. However, in some embodiments, mode decision 1020 operations may be subdivided into two or more sub-operations that may be performed at one, two, or more stages of the pipeline, with one or more components or pipeline units at each stage configured to perform a particular sub-operation. In at least some embodiments, the mode decision 1020 component receives the best intra mode from intra estimation, direct/skip mode cost from direct mode estimation, and motion vector candidates from the motion estimation engines. In at least some embodiments, the mode decision component computes additional costs for bi-directional modes and determines the best macroblock type, including macroblock partitions, subpartitions, prediction direction and reference frame indices. In at least some embodiments, the mode decision 1020 component also performs all motion vector prediction. The motion vector prediction results may be used when estimating motion vector rate during mode decision. In at least some embodiments, the motion vector prediction results may also be fed back from the mode decision 1020 component to motion estimation, for example for use in direct mode estimation and motion vector rate estimation.

Motion Compensation and Reconstruction

In at least some embodiments, motion compensation and reconstruction 1030 operations may be subdivided into two or more sub-operations that may be performed at one, two, or more stages of the pipeline, with one or more components or pipeline units at each stage configured to perform a particular sub-operation. For example, in some embodiments, motion compensation and reconstruction 1030 may be subdivided into luma motion compensation and reconstruction and chroma motion compensation and reconstruction. In at least some embodiments, each of these sub-operations of motion compensation and reconstruction 1030 may be performed by one or more components or pipeline units at one or more stages of the pipeline.

Luma Motion Compensation and Reconstruction

In at least some embodiments, a luma motion compensation component of the pipeline receives the best mode and corresponding motion vectors from mode decision 1020. As previously noted, each motion estimation engine may include a memory component that reads and stores reference frame data from a memory. If the best mode is inter-predicted, the luma motion compensation component requests reference frame macroblocks from the motion estimation engine corresponding to the motion vectors. The motion estimation engine returns subpixel interpolated 4×4 or 8×8 blocks depending on the request size. The luma motion compensation component then combines the blocks into prediction macroblocks. The luma motion compensation component then applies a weighted prediction to the prediction macroblocks to create the final macroblock predictor that is then passed to the luma reconstruction component.

In at least some embodiments, a luma reconstruction component of the pipeline performs macroblock reconstruction for luma, including intra prediction (in at least some embodiments, the luma motion compensation component performs inter prediction), forward transform and quantization (FTQ), and inverse transform and quantization (ITQ).

In at least some embodiments, based on the best mode from mode decision 1020, either an inter prediction macroblock is passed from the luma motion compensation component or intra prediction is performed by the luma reconstruction component to generate a prediction block. In intra mode, the prediction is performed in block (scan) order since reconstructed pixels from neighbor blocks are needed for prediction of future blocks. The input block is subtracted from the prediction block to generate a residual block. This residual pixel data is transformed and quantized by an FTQ technique implemented by the luma reconstruction component (or an FTQ block thereof). The coefficient data is sent to an ITQ technique implemented by the luma reconstruction component (or an ITQ block thereof), and may also be sent downstream to CAVLC encoding. The ITQ technique generates a reconstructed residual pixel block. The prediction block is added to the residual block to generate the reconstructed block. Reconstructed pixels may be passed downstream to a deblocking filter. In at least some embodiments, reconstructed pixels may also be passed back to an intra-frame estimation component of intra-frame and inter-frame estimation 1010 as feedback for use as neighbor data when processing subsequent macroblocks. In at least some embodiments, reconstructed pixels may also be passed back to an intra prediction neighbor pixel memory at the stage for use as neighbor pixels when predicting subsequent blocks inside the current macroblock at the stage.

Chroma Motion Compensation and Reconstruction

In at least some embodiments, chroma reconstruction is performed in two stages. In the first stage, chroma reference blocks needed for inter prediction are read from memory based on input macroblock type, motion vectors, and reference frame index. Subpixel interpolation and weighted prediction is then applied to generate a prediction macroblock. In the second stage, chroma intra prediction and chroma intra/inter FTQ/ITQ is performed. This allows one additional pipeline stage to load chroma prediction pixel data. Since chroma pixels are not searched by motion estimation, the chroma prediction data is read from external memory and may have large latency. In at least some embodiments, a chroma motion compensation component performs the first stage, while a chroma reconstruction component performs the second stage.

In at least some embodiments, the chroma motion compensation component generates a prediction block including subpixel interpolation for Cb and Cr chroma blocks; the size is based on the partition size and chroma formats. A full size chroma block is 8×8, 8×16, or 16×16 pixels for chroma formats 4:2:0, 4:2:2 and 4:4:4, respectively. In at least some embodiments, the chroma motion compensation component may prefetch and cache chroma prediction pixels from an external (to the pipeline) memory. In at least some embodiments, reference data may be read based on mode decision 1020 results. The chroma motion compensation component performs subpixel interpolation to generate a prediction block. Mode decision 1020 provides the macroblock type and sub-types, reference frame index per partition, and corresponding motion vectors. The prediction is output to the chroma reconstruction component.

In at least some embodiments, the chroma reconstruction component performs chroma prediction, chroma intra estimation and chroma reconstruction for inter and intra modes. For chroma formats 4:2:0 and 4:2:2, intra chroma estimation and prediction is performed. In at least some embodiments, chroma intra estimation is performed at this stage rather than at intra-frame and inter-frame estimation 1010 so that reconstructed pixels can be used during the estimation process. In at least some embodiments, if the best mode is an intra mode, intra chroma estimation may be performed based on the best intra chroma mode, and intra prediction may be performed using one of four intra chroma modes. For inter macroblocks, inter chroma prediction pixels are received from chroma motion compensation. For chroma format 4:4:4, the luma intra prediction modes are used to generate the chroma block prediction, and inter chroma prediction is performed in the same manner as for luma. Therefore, chroma reconstruction conceptually includes 4:2:0 and 4:2:2 chroma reconstruction and luma reconstruction used to reconstruct chroma in 4:4:4 chroma format.

CAVLC Encode and Deblocking

In at least some embodiments, CAVLC encoding and deblocking may be performed by one or more components at a last stage of the pipeline. In at least some embodiments, a deblocking filter component of the pipeline receives reconstructed luma and chroma pixels from the chroma reconstruction component and performs deblocking filtering according to the H.264 Recommendation. Results may be output to a memory.

In at least some embodiments, a CAVLC encode component of the pipeline receives at least luma and chroma quantized coefficients, neighbor data, and chroma reconstruction results from the chroma reconstruction component and generates a CAVLC (context-adaptive variable-length coding) encoded output stream to a memory. Note that in other embodiments, an encode component of the pipeline may generate an output stream other than a CAVLC encoded bit stream, for example an output stream in a proprietary format or in a format defined by another compression standard, such as the HEVC standard.

In at least some embodiments, the deblocking filter component and the CAVLC encode component write neighbor data for the bottom row of a quadrow to a memory at quadrow boundaries. Referring again to FIG. 10, for the top row of a next quadrow, macroblock input 1002 may then read this neighbor data from the memory at quadrow boundaries and pass the neighbor data to at least one downstream stage of the pipeline.

Transcoder

In at least some embodiments, a transcoding operation may be performed by a transcoder 1050. The transcoder may be implemented as a functional component of the pipeline or as a functional component that is external to the pipeline. In at least some embodiments, the transcoder 1050 may perform a memory-to-memory conversion of a CAVLC (context-adaptive variable-length coding) encoded stream output by the pipeline to a CABAC (context-adaptive binary arithmetic coding) encoded stream. Note that in other embodiments, the transcoder 1050 may perform a memory-to-memory conversion of data in a format other than a CAVLC encoded bit stream (e.g., data in a proprietary format or in a format defined by another compression standard, such as the HEVC standard) to a CABAC encoded bit stream.

In at least some embodiments, the pipeline may encode in an order other than scan order, for example knight's order as previously described herein. However, ultimately, the video encoder's encoded bit stream should be transmitted in scan order. In at least some embodiments, re-ordering the block output from knight's order to scan order is accomplished by the CAVLC encode component writing encoded data to r different output buffers, each output buffer corresponding to a row of blocks from the row group, where r is the number of rows in a row group. As a non-limiting example of a row group, a quadrow as used herein includes four rows. At the end of a row group, each row buffer will contain a scan order stream of encoded blocks for a respective row. This is illustrated in FIG. 11 and described in more detail below.

In embodiments in which CAVLC component writes encoded data to multiple output buffers, transcoder 1050 may handle stitching together the start and end of each row to generate a continuous stream at macroblock row boundaries. In at least some embodiments, the pipeline may embed metadata in the CAVLC output stream to facilitate stitching of the rows by the transcoder 1050. For example, synchronization markers (e.g., H.264 supplemental enhancement information (SEI) messages in a byte-stream format) may be inserted at various points in the bit stream. The inserted synchronization markers may include messages containing header information (which may be generated by software and may be bypassed by the transcoder) or end of row information (which may be generated by the CAVLC encode hardware at the end of a macroblock row), and may also include a uniquely decodable H.264 start code. In some embodiments, each SEI message may contain a three-byte start code, a network abstraction layer (NAL) type, a payload type, and a payload size field. The payload type field may differentiate between a header message and an end-of-row message. The payload size fields may indicate where the last bit of a header or data stream occurs. Note that in some embodiments, an end-of-row marker will never immediately follow a header marker.

As noted above, when the CAVLC component writes out a CAVLC bit stream, it may write out portions of the encoded data to r separate DMA buffers, where r is the number of rows in a row group. For example, when using quadrows, r=4. In other words, in some embodiments the CAVLC component may generate a separate bit stream for the data representing the macroblocks in each row of a quadrow of a video frame and may write each of those separate bit streams to a different DMA buffer in scan order. FIG. 11 is a block diagram illustrating how blocks that are encoded in knight's order by the CAVLC component are written to multiple DMA buffers in scan order, according to one embodiment. In this example, quadrows (r=4) are assumed, and the order in which the blocks of pixels are processed by the block processing pipeline and encoded by the CAVLC component is indicated by the labels on the blocks. For example, after encoding the block that is labeled "32" (which is in the top row of quadrow 1110), the CAVLC component may encode (in the following order): the block labeled "33" (in the second row), the block labeled "34" (in the third row), and the block labeled "35" (in the bottom row). However, the encoded data representing each of these blocks may be written to a different one of the DMA buffers. After encoding block 35 (which is in the bottom row of quadrow 1110), the CAVLC component may encode the blocks labeled "36" (in the top row), "37" (in the second row), "38" (in the third row), "39" (in the bottom), and so on, rotating through the rows of the quadrow in this pre-defined order to obtain the next block to be processed.

Figure 11:
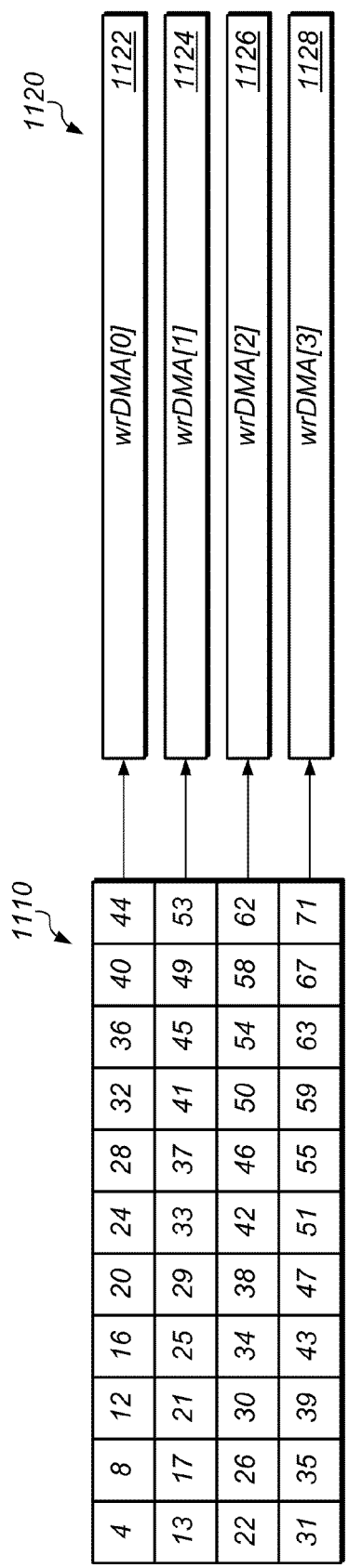
FIG. 11 is a block diagram illustrating how blocks that are encoded in knight's order are written to buffers in scan order, according to one embodiment.

In this example, four separately encoded bit streams (one corresponding to each row of quadrow 1110) are written to the CAVLC encoded bit stream buffers 1120 as indicated in FIG. 11. For example, the encoded bit stream representing the blocks in the top row of quadrow 1110 (including blocks 32 and 36) are written to buffer wrDMA[0] (which is labeled 1122), the encoded bit stream representing the blocks in the second row of quadrow 1110 (including blocks 33 and 37) are written to buffer wrDMA[1] (labeled 1124), the encoded bit stream representing the blocks in the third row of quadrow 1110 (including blocks 34 and 38) are written to buffer wrDMA[2] (labeled 1126), and the encoded bit stream representing the blocks in the bottom row of quadrow 1110 (including blocks 35 and 39) are written to buffer wrDMA[3] (labeled 1128). In other words, the CAVLC component may step through the blocks of the quadrow in knight's order to encode them, interleaving the block data from different rows, but may write out the encoded data to multiple buffers in a manner that ultimately restores the data corresponding to each block of pixels to scan order.

Note that after writing the encoded data for one of the blocks to a particular DMA buffer (the DMA buffer designated for buffering encoded data from the row in which the block is located), the DMA buffer may maintain enough state to remember the bit position at which the encoded data for the block stopped. Subsequently, when the encoded data for the next block on the same row is written to the DMA buffer (e.g., four encoding cycles later when using quadrows), it may be inserted into the bit stream at a position immediately following the bit position at which the encoded data for the previous block stopped. Once the encoded data for all of the blocks in the quadrow has been written to the appropriate DMA buffers, the data in the r (e.g., four for quadrows) DMA buffers may be merged (e.g., concatenated) to generate a single CAVLC encoded bit stream for the quadrow that can be written to memory and/or provided to another (downstream) component of the video encoder (e.g., the transcoder). In some embodiments, the encoded data for each individual row of the quadrow may be written out to memory in scan order from its DMA buffer once all of the encoded data for that row has been written to the DMA buffer.

In various embodiments, any or all of the following data may be pushed to the DMA buffers by the CAVLC component: the encoded bits for multiple macroblock rows (e.g., using one channel for each row of a processed quadrow), neighbor information (e.g., CAVLC encoded syntax elements representing neighbor data, using one channel), co-located data for use in direct mode estimation (e.g., using one channel), and/or firmware data (which may be pushed by a processor of the CAVLC component to the DMA over one channel, in some embodiments).

Note that while several of the embodiments of the video encoders described herein operate on macroblocks from four rows of a video frame at a time (e.g., a quadrow), in other embodiments, the video encoders may operate on macroblocks from row groups that include a different number of macroblock rows. In these other embodiments, the number of DMA buffers into which CAVLC encoded data is written in scan order prior to being provided to the transcode component may be equal to the number of macroblock rows that are processed as a row group by the video encoders.

As previously noted, in some embodiments the video encoders described herein may include a transcode pipeline that operates substantially in parallel with (or at least overlapping) the operation of a block processing pipeline (which may include a CAVLC component such as those described herein). In some embodiments, once all of the blocks of pixels in a pre-defined portion of a video frame (e.g., quadrow) have been encoded, the transcode pipeline may read the encoded blocks from the DMA buffers into which they have been written in scan order and may merge them into a single bit stream (again, in scan order). The transcode pipeline may decode the encoded blocks and encode them using context-adaptive binary arithmetic coding (CABAC), or may output a CAVLC bit stream. In the meantime, the block processing pipeline (or more specifically, the CAVLC component) may process blocks of pixels in other quadrows of the frame without having to wait for the transcode pipeline to complete its work processing the data that represents the previous quadrow. In some embodiments, instead of waiting for all of the blocks in a row group (e.g., a quadrow) to be encoded and written to the buffers, the transcode pipeline may begin to read and process encoded blocks from a first row buffer in scan order as soon as a first block of the first row of the row group has been written to the buffer. However, the transcode pipeline cannot begin to read and process encoded blocks from a subsequent row until the last block of a current row has been read from the current row buffer.

Figure 12:
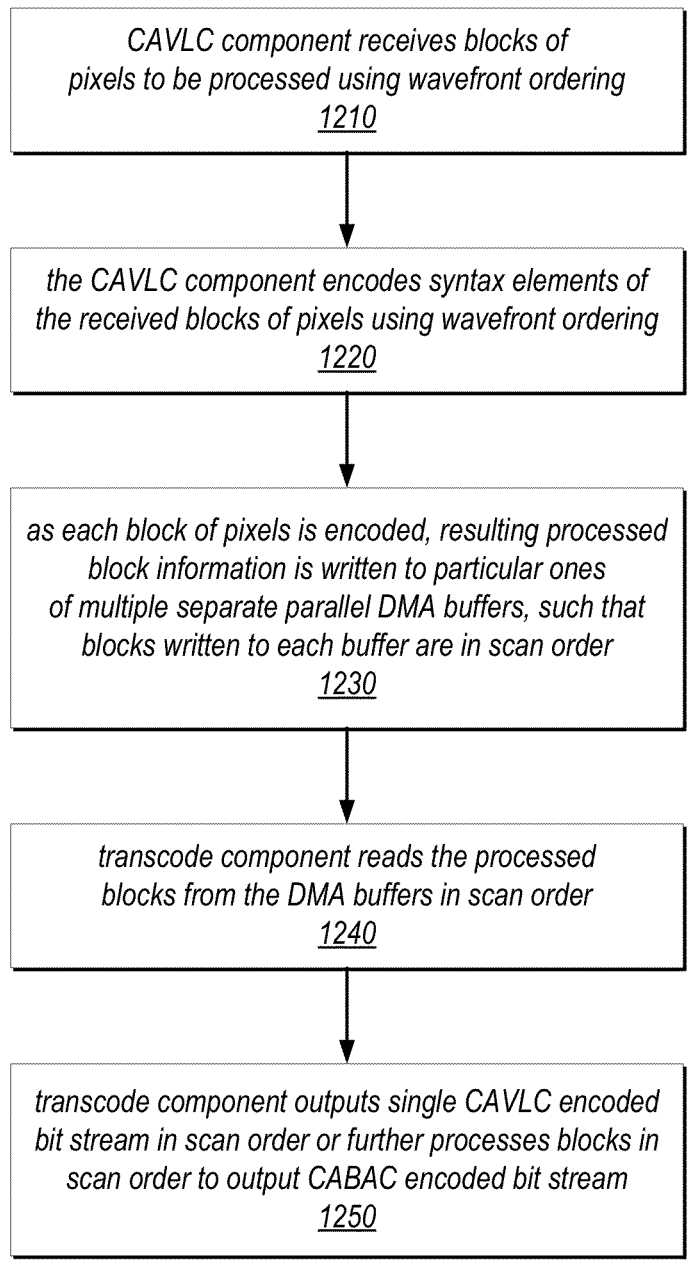
FIG. 12 is a flow diagram illustrating one embodiment of a method for performing video encoding using wavefront encoding with parallel bit stream encoding.

One embodiment of a method for performing video encoding using wavefront encoding with parallel bit stream encoding is illustrated by the flow diagram in FIG. 12. As illustrated at 1210, in this example, the method may include an encode component, for example a context-adaptive variable-length coding (CAVLC) component, receiving blocks of pixels to be processed using wavefront ordering. For example, the encode component may be a component of a block processing pipeline that includes multiple stages, each of which is configured to perform one or more operations on a block of pixels passing through the pipeline. Note that in various embodiments the encode component may encode in CAVLC format or in encoding formats other than CAVLC, for example in a proprietary encoding format or in an encoding format defined by another compression standard, such as the HEVC standard. In some embodiments, the blocks of pixels to be processed are input to the block processing pipeline according to knight's order such that each input block is located in the frame one row down and at least one column to the left of the location of the previously input block. As illustrated at 1220, the method may also include the encode component (e.g., a CAVLC encode component) encoding syntax elements of the received blocks of pixels, again using wavefront ordering (e.g., knight's ordering or another type of wavefront ordering). In wavefront ordering, rather than inputting blocks in scan order, blocks are input to the pipeline from subsequent rows in a row group so that adjacent blocks on a row are not concurrently at adjacent stages of the pipeline.

As each block of pixels is encoded, the method may include writing the resulting processed block information to particular ones of multiple separate parallel DMA buffers, such that blocks written to each buffer are in scan order (as in 1230). For example, the processed block information (e.g., encoded syntax elements for the input blocks) may be written to the buffers such that the processed blocks represented by the information written to each of the buffers represent consecutive blocks of pixels in the frame in scan order.

As illustrated in FIG. 12, the method may also include a transcode component reading the processed blocks from the DMA buffers in scan order, as in 1240. Subsequently, the method may include the transcode component outputting a single encoded bit stream (e.g., a CAVLC encoded bit stream) in scan order or further processing the encoded blocks in scan order to generate and output an alternatively encoded bit stream, for example a context-adaptive variable-length coding (CABAC) bit stream, as in 1250.

Figure 13:
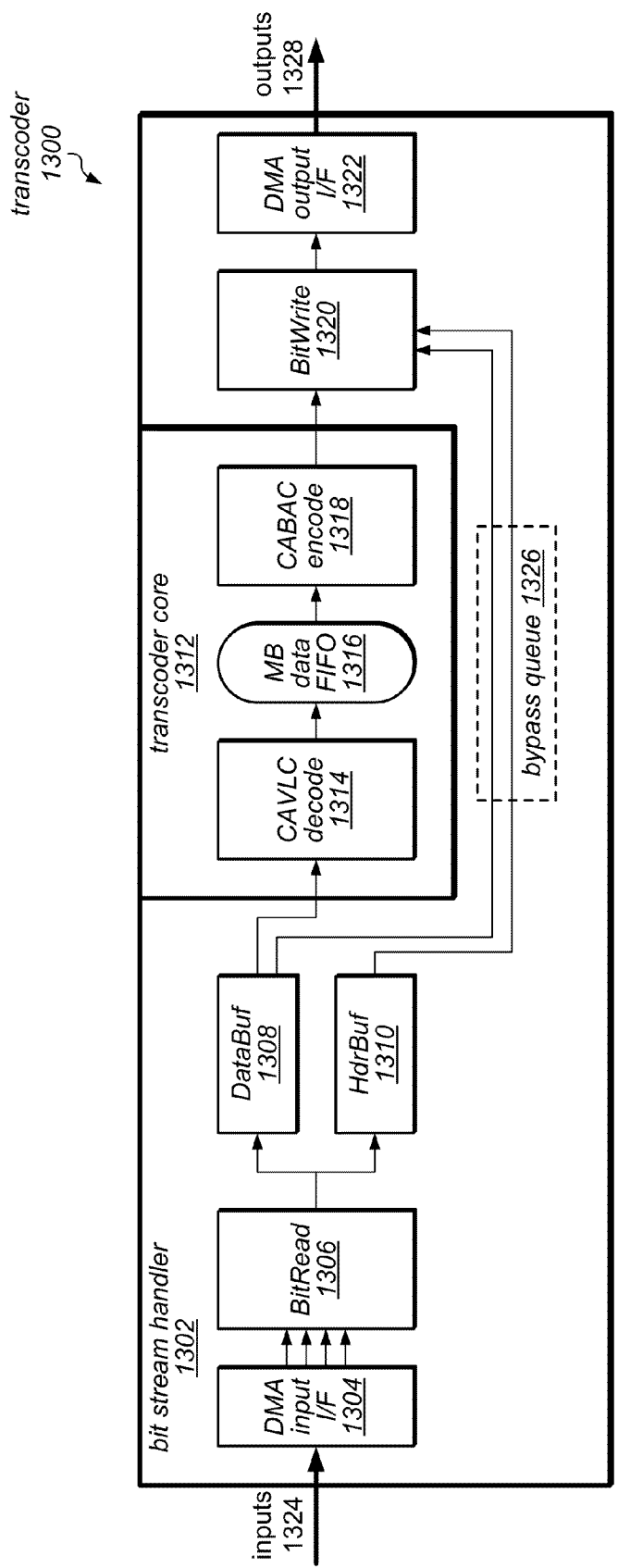
FIG. 13 is a block diagram illustrating one embodiment of a transcoder.

One embodiment of a transcode component is illustrated by the block diagram in FIG. 13. As illustrated in FIG. 13, the transcode component (shown as transcoder 1300) may include a bit stream handler 1302 (which may include a DMA input interface 1304, a bit reader component 1306, a data buffer 1308, a header buffer 1310, a bit writer component 1320, and a DMA output interface 1322), a transcoder core 1312 (which may include a CAVLC decode component 1314, a macroblock data FIFO 1316, and a CABAC encode component 1318), and a bypass queue 1326.

The inputs to transcoder 1300 (shown as inputs 1324) may include the CAVLC encoded bits for multiple macroblocks, which may be written to different channels of DMA input interface 1304, neighbor information (e.g., CAVLC encoded syntax elements representing neighbor data, received over one DMA channel), co-located data for use in direct mode estimation (e.g., received over one DMA channel), and/or firmware data (which may be received from a processor of the CAVLC component over one DMA channel), in various embodiments. In at least some embodiments, the outputs of transcoder 1300 (shown as outputs 1328) may include a single encoded bit stream (e.g., a CAVLC encoded bit stream or a CABAC encoded bit stream), as described herein.

In some embodiments, the DMA input interface of the transcode component may share a single data bus with four push/credit interfaces. In some such embodiments, the inputs to the bit reader component (shown as BitRead 1306) from DMA input interface 1304 may include a push input and data, and the outputs from BitRead 1306 back to DMA input interface 1304 may include a multiple-bit credit output. In such embodiments, the outputs from the bit writer component (shown as BitWrite 1320) to DMA output interface 1322 may include push and data outputs, and the inputs to BitWrite 1320 from DMA output interface 1322 may include the multiple-bit credit output from DMA output interface 1322. In the example transcode component illustrated in FIG. 13, bypass queue 1326 is illustrated as a component on the path within bit stream handler 1302 from the data buffer (shown as DataBuf 1308) to the bit writer component (BitWrite 1320) and from the header buffer (shown as HdrBuf 1310) to BitWrite 1320.

As described herein, the transcode component may be configured to stitch together the CAVLC encoded data corresponding to the block at the end of each row of a video frame (or a quadrow thereof) and the data corresponding to the block at the beginning of the next row (in scan order), and to align the data correctly (e.g., using barrel shifting). If the desired output of the video encoding exercise is CAVLC encoded data for the blocks of a video frame, the operations of the transcoder core (such as transcoder core 1312) may be elided. In this case, the CAVLC encoded data may pass through a bypass queue (such as bypass queue 1326), rather than through the transcoder core. However, the CAVLC encoded data is still stitched and aligned by the transcode component. If the desired output of the video encoding exercise is CABAC encoded data, the transcode component (or, more specifically, the transcoder core) may also be configured to convert the CAVLC encoded data to CABAC encoded data prior to writing the output bit stream to memory. In this case, the main block processing pipeline may be configured to begin processing another quadrow of blocks (e.g., performing CAVLC encoding of the blocks in knight's order and then writing them out to multiple DMA buffers) while the transcode component performs the operations to convert the CAVLC encoded data to CABAC encoded data.

As described herein, because the main block processing pipeline (which includes the CAVLC encode component) writes its outputs (e.g., a CAVLC encoded bit stream) to a memory buffer and the transcode component reads from that memory buffer to obtain its inputs, the memory may effectively serve to decouple the CAVLC encoding from the transcoder core, allowing the main block processing pipeline and a separate transcode pipeline to operate in two different quadrows at once. In some embodiments, this "decoupling" may reduce (or eliminate) an otherwise tight constraint on the overall video encoding process that the transcode component must finish operating on each macroblock before another stage in the main block processing pipeline can continue, as might be the case if the transcode operation were a stage of the main block processing pipeline. Instead, the transcode pipeline may work to process a quadrow in its own time, as long as the average time to process a quadrow is acceptable.

Note that the stages of the main block processing pipeline may essentially operate in lock step. Therefore, if one stage takes longer than another to complete its work, the speed at which the pipe is able to operate may only be as fast as the speed of the slowest stage. In some embodiments, most of the stages of the main block processing (other than the CAVLC encoding stage) operate at what is effectively a fixed rate because they always perform the same amount of work. However, the amount of work done by the CAVLC encoding stage may vary widely, depending on how many bits it needs to process. In some embodiments, the CAVLC encode component may be designed to meet a target cycle time budget in most cases, while any individual CAVLC encoding operation may be over or under that target cycle time budget. In some embodiments, it may be difficult to perform some of the transcoding operations (which include CABAC encode operations) within the same target cycle time budget as the stages of the main block processing pipeline. However, by decoupling the transcode pipeline from the main block processing pipeline (essentially double-buffering a lot of the context between the two pipelines), the video encoders described herein may use the memory buffers as a FIFO that adds a measure of flexibility and/or elasticity between the two pipelines. In some embodiments, as long as both pipelines can, on average, meet the target cycle time for the pipeline, the video encoder may be able to meet its overall performance targets.

In some embodiments, as soon as the memory buffers include enough information (e.g., CAVLC encoded data for one quadrow), the transcode component may begin working on that data. In some embodiments, instead of waiting for all of the blocks in a row group (e.g., a quadrow) to be encoded and written to the buffers, the transcode pipeline may begin to read and process encoded blocks from a first row buffer in scan order as soon as a first block of the first row of the row group has been written to the buffer. In other words, the main block processing pipe and the transcode pipe may operate substantially in parallel (or at least overlapping), such that the main block processing pipeline can begin working on the next video frame (or quadrow thereof) before the transcoding of the previous frame (or quadrow) has been completed. In some embodiments, the DMA buffers may be configured to keep track of the amount of data that was written out of the CAVLC encode component so that the transcoder does not overrun the bits being written by the main pipeline. Similarly, the DMA buffers may be configured such that the main block processing pipeline cannot overwrite the data in the buffers until the transcoder has finished reading it. In some embodiments, a hardware interlock mechanism may be used to prevent the main block processing pipeline overwriting the CAVLC data and to keep the transcoder from reading ahead of the main block processing pipeline. One approach to managing the CAVLC encode to transcode memory buffering is described below.

Bit Stream Handler

As previously noted, the bit stream handler (such as bit stream handler 1302) of a transcode component (such as transcoder 1300) may merge CAVLC encoded data from four DMA buffers (which may be in external memory) into a single contiguous CAVLC bit stream, or into a transcoded CABAC stream, and may output the final bit stream to memory. For example, in CAVLC mode, the DMA buffers (sometimes referred to as CAVLC intermediate buffers) may be read in scan order and the bit streams read from these buffers may be written as a single contiguous bit stream to an output buffer. In CABAC mode, the DMA buffers (or CAVLC intermediate buffers) may be read in scan order and transcoded into a CABAC encoded bit stream, which may then be written in a continuous output buffer in memory.

In some embodiments, each buffer contains CAVLC encoded bits for one row of contiguous macroblocks of a video frame in scan order. For each row buffer, a pointer may describe the final bit position in that buffer (e.g., using SEI synchronization markers or another synchronization mechanism). In some embodiments, after merging the input streams from the buffers, start codes, SEI message headers and/or other elements of the input streams may be parsed and removed (e.g., header information may be split from encoded data). At the output, header information may be re-merged with raw CAVLC encoded block data (in CAVLC mode), or with transcoded block data (in CABAC mode), and start codes may be re-inserted before the final bit stream is written to memory. Components of the bit stream handler and transcoder core are described in more detail below, according to various embodiments.

Bit Reader

In some embodiments, a bit reader component of the bit stream handler (such as BitRead 1306) receives CAVLC encoded data from four DMA channels, reads bits from the channel corresponding to the current macroblock row, detects start codes (e.g., in SEI markers), and provides a contiguous bit stream to a CAVLC decode component (such as CAVLC decode 1314) or to a bypass queue (such as bypass queue 1326). Note that stitching together data from different rows may be performed for both cases. The bit reader may also optionally remove start codes or other information from the input bit stream. In some embodiments, when a header SEI message is detected in the input bit stream, the bit reader may be configured to send header data bits to the bypass queue, rather than passing them to the transcoder core (such as transcoder core 1312). In some embodiments, the SEI message may indicate the number of bits contained in the header, and may also include an indication of the bit position of the end of the data for a row of macroblocks (which may be subsequently used for alignment purposes when stitching together data from different rows. In some embodiments, the bit reader may discard SEI messages that are detected in the input stream. It may also signal to a bit writer (such as BitWrite 1320) to insert a new start code before inserting CAVLC encoded data from the bypass queue. In at least some embodiments, BitWrite needs to finish writing any macroblock data from CABAC encode before inserting the header data.

In some embodiments, when transcoding a macroblock, neighbor data from the macroblock above may be used in predicting syntax elements in the current macroblock. In some embodiments, left neighbor data may be maintained by the transcode component (such as transcoder 1300), and top neighbor data may be maintained in a buffer in external memory. In some such embodiments, before transcoding a macroblock, top neighbor data may be read from DMA. After transcoding the macroblock, neighbor data may be written to DMA for use in processing macroblocks on the next row.

Input DMA

As noted above, the transcoder DMA input interface (such as DMA input interface 1304) may share a single data bus with four push/credit interfaces. In some embodiments, each interface may independently control a single DMA buffer, but only one buffer can be written to at a time. Under the push/credit protocol, a credit may indicate a free entry within a buffer. In some embodiments, each buffer can be written to at any time, i.e., there may be no restriction on the order of the input data.

Figure 14:
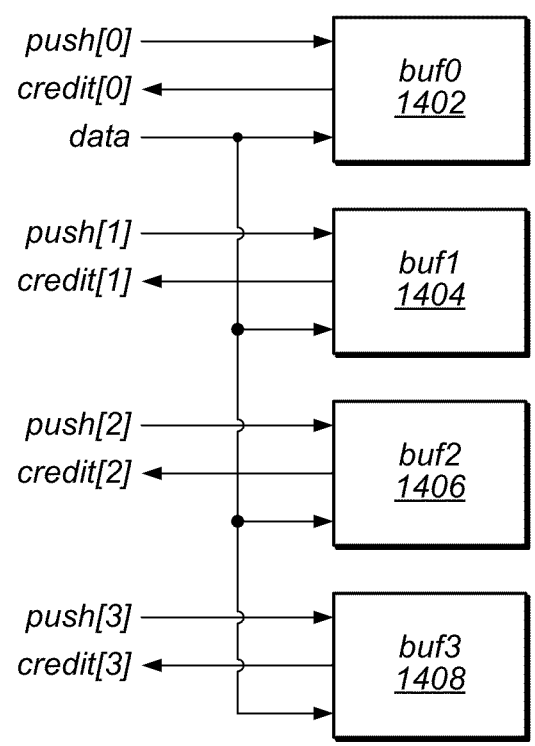
FIG. 14 is a block diagram illustrating a DMA input interface, according to one embodiment.

One embodiment of DMA input interface (such as DMA input interface 1304 in FIG. 13) is illustrated by the block diagram in FIG. 14. As illustrated in this example, the DMA input interface may include, for each of the DMA buffers (shown as buf0 1402, buf1 1404, buf2 1406, and buf3 1408), a push input (e.g., push[0], push[1], push[2], and push[3], respectively) and a data input. The DMA input interface may also include, for each of the DMA buffers, a credit output (e.g., credit[0], credit[1], credit[2], and credit[3], respectively).

Output DMA

The transcoder DMA output interface (such as DMA output interface 1322) may also follow the push/credit protocol. Additionally, an idle signal may indicate to the write DMA engine that the transcode component has finished operating on the current block data, and it should flush any pending data to memory.

CAVLC Decode

In some embodiments, a CAVLC decode component (such as CAVLC decode 1314) may be configured to extract macroblock header data and quantized coefficients for the CABAC encode component (such as CABAC encode 1318) to encode. In some embodiments, the data may be sent from the CAVLC decode component to the CABAC encode component using a macroblock data FIFO (such as MB data FIFO 1316) that contains three sections, in the following order: macroblock header information, significance map information, and quantized coefficient data. The output of the CABAC encode component (e.g., a single contiguous CABAC encoded bit stream) may be sent to the bit writer (such as BitWrite 1320).

In some embodiments, a CAVLC decode component (such as CAVLC decode 1314) may be configured to detect errors in the bit stream, for example errors due to memory corruption or transmission errors between the CAVLC encoder of the main pipeline and the bit stream handler (such as BitRead 1306). This error detection may, for example facilitate re-encoding or recovery of the bit stream if necessary and/or error recovery at the application level.

Bit Writer

In some embodiments, the bit writer (such as BitWrite 1320) may receive encoded block data from the CABAC encoder or the bypass queue, insert start codes into the bit stream (e.g., before inserting header data) and provide a contiguous bit stream to the DMA output interface (such as DMA output interface 1322). For example, when header data is sent through the bypass queue, the bit writer may insert a start code into the bit stream before inserting the header data received from the bypass queue. In some embodiments, the bit writer may need to finish writing any macroblock data from the CABAC encode component before inserting the header.

As previously noted, different approaches (e.g., different synchronization mechanisms) may be employed to synchronize the operations between a block processing pipeline (which may include an encode component such as a CAVLC encode component) and a separate transcode pipeline that operates in parallel with (or at least overlapping) the block processing pipeline, in different embodiments. As described herein, in one approach, an encode component of a block processing pipeline writes bit streams to four different DMA buffers in memory, and the transcode pipeline reads data from the same four DMA buffers to re-encode it in scan order. In other words, in some embodiments, the video encoders described herein may employ multiple DMA buffers to decouple the block processing pipeline from the transcode pipeline so that they can operate at least somewhat independently, while providing a mechanism for constructing input and output bit streams to these pipelines in the formats required for their operation.

Figure 15:
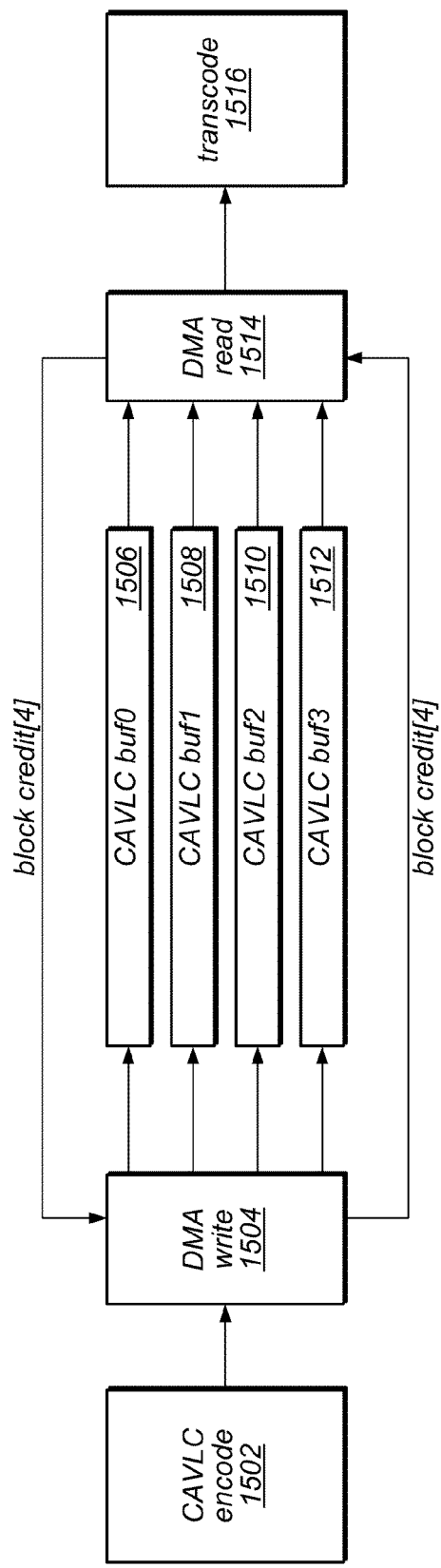
FIG. 15 is a block diagram illustrating CAVLC to transcode memory buffer management, according to one embodiment.

One such encode component to transcode memory buffer management approach is illustrated by the block diagram in FIG. 15, according to some embodiments. As illustrated in this example, this approach relies, at least in part on a credit-based protocol. In this example, CAVLC encode 1502 sends CAVLC encoded block data (e.g., in wavefront ordering) to DMA write 1504, and DMA write 1504 writes the CAVLC encoded block data into four different DMA buffers, shown as CAVLC buf0 (1506), CAVLC buf1 (1508), CAVLC buf2 (1510), and CAVLC buf3 (1512). DMA read 1514 then reads the data from the buffers in scan order and sends it (in a single contiguous bit stream) to transcode 1516. In this example, block credits (which are illustrated in FIG. 15 as block credit [4]) are exchanged between DMA write 1504 and DMA read 1514 according to a push/credit protocol, where a credit indicates that there is a free entry in the corresponding buffer.

In some embodiments, each buffer has a parameter whose value defines the size of the buffer (e.g., BfrSize[0], BfrSize[1], BfrSize[2], and BfrSize[3], respectively), and another parameter whose value defines the base address for the buffer (e.g., BaseAddr[0], BaseAddr[1], BaseAddr[2], and BaseAddr[3], respectively). When writing to one of the DMA buffers from the CAVLC encode component or reading from one of the DMA buffers (by the transcoder), if the writing or reading operation reaches the buffer size indicated by its buffer size parameter value, the read or write pointer may wrap around to the base address for that buffer. Note that each macroblock row of bit stream data can have a different size and may potentially wrap at different times. Therefore, in some embodiments, enough space may be allocated in each buffer to hold the worst case bit stream size of at least one macroblock row of bit stream data. In some embodiments, a hardware counter may be configured to count up to 64B blocks that are written from the CAVLC encode component and read by the transcode component such that the CAVLC encode component cannot over-write data that has not yet been read by the transcode component and such that the transcode component cannot read data that has not yet been written by the CAVLC encode component. In some embodiments, the block credits for each buffer may be initialized by software to the bit stream size of the rows contained in the corresponding buffer.

While FIG. 15 shows a CAVLC encode 1502 component and buffers for CAVLC data output by the CAVLC encode 1502 component, in other embodiments, an encode component of the pipeline may generate an output stream other than a CAVLC encoded bit stream. For example, an encode component may generate an output stream in a proprietary encoding format or in an encoding format defined by another compression standard, such as the HEVC standard.

Transcoder Modes of Operation

As previously noted, in at least some embodiments, the transcode component (sometimes referred to as the transcode engine) may operates in two different modes, a CAVLC mode (which may also be referred to as bypass mode) or a CABAC mode. In CAVLC mode, the operations of the transcoder core may be elided. In this mode, the bit reader may be configured to merge r CAVLC encoded input bit streams (one for each row of a row group, where r is the number of rows in a row group) into a single bit stream, remove start codes and/or other header information, parse and remove SEI messages (e.g., SEI synchronization markers), and sends all other data through the bypass queue to the bit writer. As previously noted, a new start code may be inserted by the bit writer before the header. In this mode, the bit writer may receive an input bit stream from the bypass queue, insert start codes and/or other information into the bit stream, and then write the final output bit stream to DMA.

In CABAC mode (which may also be referred to as transcode mode), the bit reader may again be configured to merge r CAVLC encoded input bit streams (one for each row of a row group) into a single bit stream, remove start codes and/or other header information, and parse and remove SEI messages (e.g., SEI synchronization markers). Other header information that may be included in a macroblock row may, for example, include slice headers (e.g., slice headers as defined by the H.264 standard) and/or I-PCM (Intra-pulse code modulation) coded macroblocks. However, in this mode, the bit reader may be configured to send header data through the bypass queue to the bit writer, and to send encoded block data (e.g., various CAVLC encoded syntax elements) to the CAVLC decode component. In this mode, the CAVLC decode component may be configured to decode those inputs and to send the decoded syntax elements to the CABAC encode, which may encode them using CABAC encoding and then forward the CABAC encoded bits to the bit writer. In this mode, the bit writer may receive CABAC encoded block data from the CABAC encode component, and may be configured to re-insert the header codes that were removed by the bit reader (e.g., start codes and/or other header codes that were received from the bypass queue), and synchronize the insertion of this header information into the output bit stream. The bit writer may then write the final output bit stream to DMA. In at least some embodiments, the bit reader and/or bit writer may also be configured to handle the insertion of metadata (e.g., supplemental enhancement information (SEI) metadata or voice user interface (VUI) metadata) specified by a video encoding standard into an output bit stream.

While the transcoder is generally described herein as receiving CAVLC data output by an encode component of a block processing pipeline and generating and outputting either a CAVLC output bit stream or a CABAC output bit stream, in other embodiments the transcoder may receive data input in encoding formats other than CAVLC, and may generate output bit streams in other formats than CAVLC and CABAC. For example, the transcoder may receive an input stream in a proprietary encoding format or in an encoding format defined by another compression standard, such as the HEVC standard, and may generate an alternatively encoded bit stream as output in an encoding format that may be but is not necessarily CABAC.

Figure 16A:
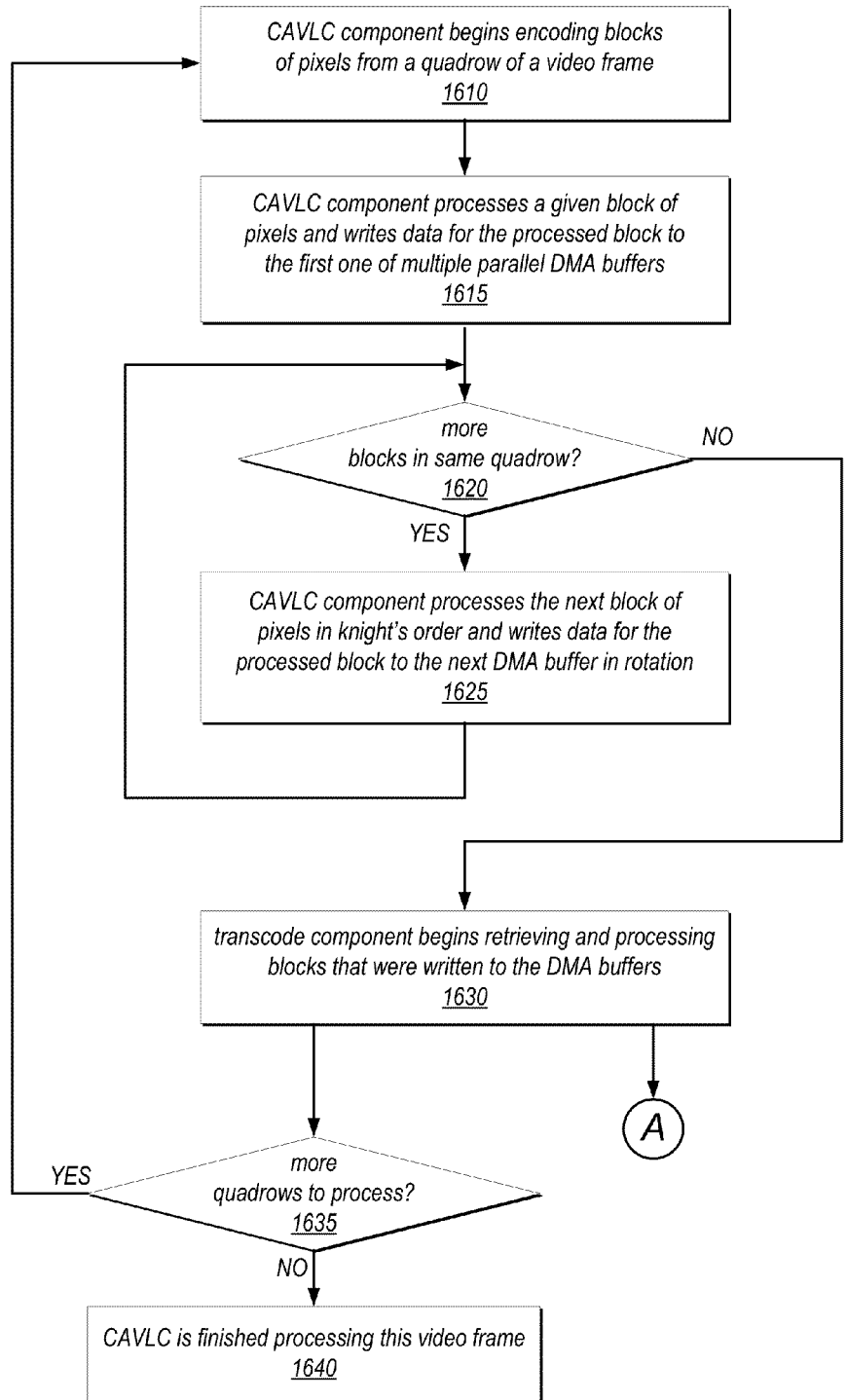
FIGS. 16A and 16B illustrate one embodiment of a method for performing CAVLC encoding in knight's order and transcoding in scan order.
Figure 16B:
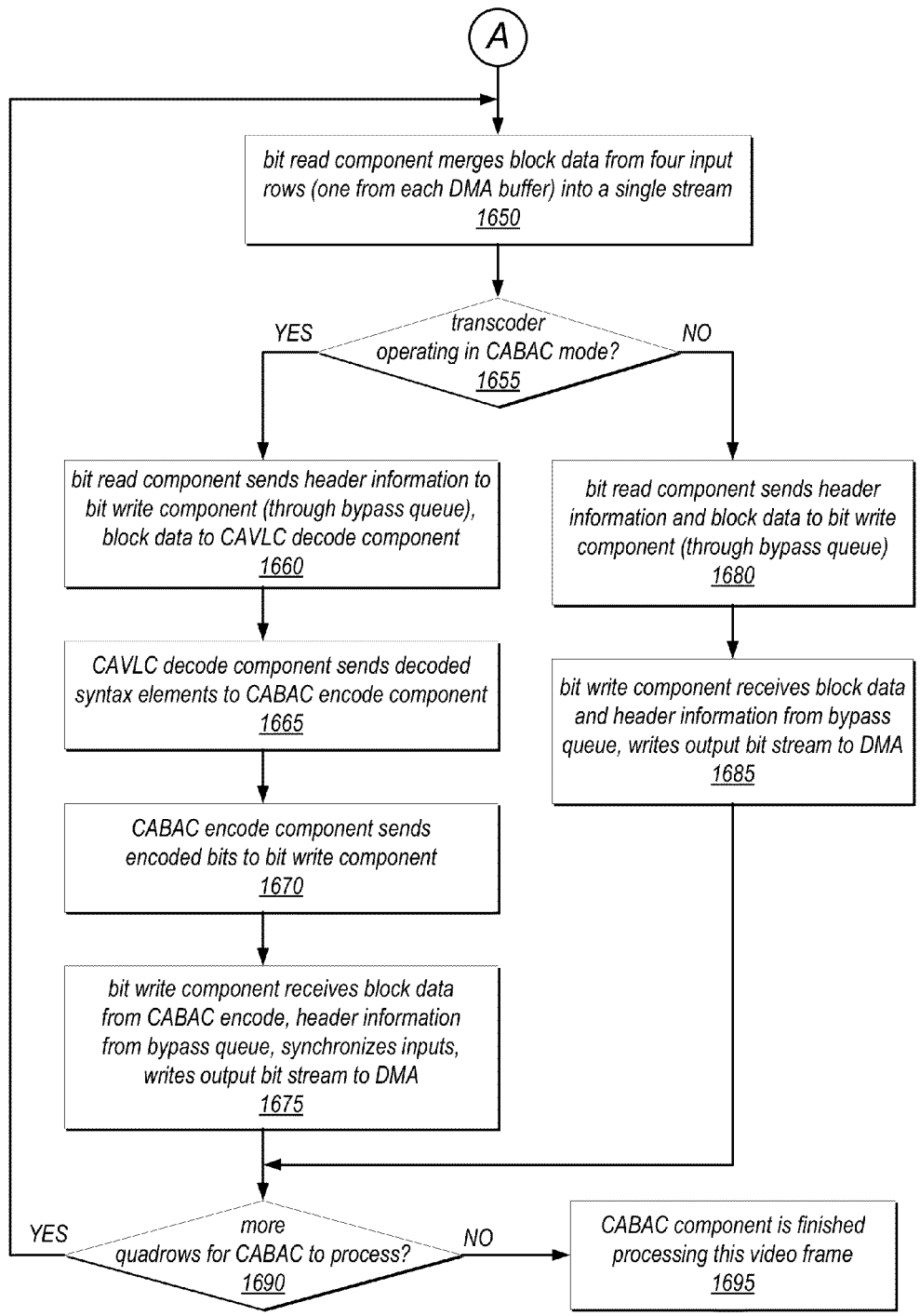

FIGS. 16A and 16B illustrate a method for performing CAVLC encoding in knight's order and performing transcoding in scan order, according to one embodiment. As illustrated at 1610, in this example, the method may include a CAVLC component of a block processing pipeline beginning an operation to encode blocks of pixels from a quadrow of a video frame. The method may include the CAVLC component processing a given block of pixels and writing data representing the processed (CAVLC encoded) block to the first one of multiple parallel DMA buffers, as in 1615.

If there are more blocks of pixels in the same quadrow (shown as the positive exit from 1620), the method may include the CAVLC component processing the next block of pixels in knight's order and writing data representing the processed (CAVLC encoded) block to the next DMA buffer in a pre-determined rotation order, as in 1625. For example, in embodiments that include four DMA buffers, data representing different CAVLC encoded blocks may be written to each successive one of the buffers in turn until data has been written to all four buffers (e.g., writing data representing four CAVLC encoded blocks to the first buffer, the second buffer, the third buffer, and the fourth buffer, respectively), and this pattern may be repeated (with the data representing the next four CAVLC encoded blocks being written to the first buffer, the second buffer, the third buffer, and the fourth buffer, respectively). As illustrated by the feedback from 1625 to 1620 in FIG. 16A, the operations illustrated at 1625 may be repeated until all of the blocks of pixels in the same quadrow have been encoded and written to the DMA buffers.

As illustrated in this example, if there are no additional blocks of pixels in the same quadrow (or once all of the blocks of pixels in the quadrow have been processed), the method may include a transcode component (e.g., a transcode component of a transcode pipeline that operates substantially in parallel with the block processing pipeline) beginning to retrieve and process the encoded blocks that were written to the DMA buffers, as in 1630. The processing of the encoded blocks is illustrated in FIG. 16B (beginning after connection element A) and described below. Note that in this example, the transcode component may begin transcoder processing while the block processing pipeline (or, more specifically, the CAVLC component of the block processing pipeline) continues to receive additional blocks of pixels (in knight's order) and to process them in parallel to the work of the transcode pipe (e.g., encoding various syntax elements of the received blocks using CAVLC).

As illustrated in FIG. 16A, until there are no more quadrows to process, the method may include repeating the operations at 1610-1630, processing and encoding additional blocks of pixels in additional quadrows of the video frame. This is illustrated in FIG. 16A by the feedback from the positive exit of 1635 to 1610. Once there are no additional quadrows to process (shown as the negative exit from 1635), the CAVLC component may be finished processing the current video frame, as in 1640. Note that, although it is not illustrated in FIG. 16A, in some embodiments the operations illustrated in FIGS. 16A and 16B may be repeated for one or more additional video frames, as needed.

As illustrated at 1650 in FIG. 16B, once the operation of the transcode component is initiated, the method may include a bit reader component (e.g., a bit reader component of the transcoder or of a bit stream handler thereof) merging CAVLC encoded block data from four input rows (e.g., one from each DMA buffer) into a single bit stream. If the transcoder is operating in CABAC mode (shown as the positive exit from 1655), the method may include the bit reader component sending header information to a bit writer component of the transcoder or of a bit stream handler thereof (e.g., through a bypass queue), and sending block data to a CAVLC decode component of the transcode component (or a transcoder core thereof), as in 1660. The method may also include the CAVLC decode component sending decoded syntax elements to a CABAC encode component of the transcode component or a transcoder core thereof (e.g., through a macroblock FIFO), as in 1665, and the CABAC encode component sending the CABAC encoded bits to a bit writer component of the transcoder or a bit stream handler thereof, as in 1670.

As illustrated in this example, when the transcoder is operating in transcode mode, the method may include the bit writer component receiving CABAC encoded block data from the CABAC encode component, receiving header information from the bypass queue, synchronizing these two inputs, and writing the resulting output bit stream to the DMA, as in 1675. On the other hand, if the transcoder is operating in CAVLC (bypass) mode (shown as the negative exit from 1655), the method may include the bit reader component sending header information and CAVLC encoded block data to the bit writer component (e.g., through bypass queue), as in 1680. In this case, the method may also include the bit writer component receiving the CAVLC encoded block data and header information from the bypass queue, and writing out a CAVLC encoded output bit stream to the DMA, as in 1685.

As illustrated in this example, as long as there are more quadrows to be processed by the CABAC component, the method may include repeating the operations at 1650-1685 to further process the CAVLC encoded block data for the blocks of pixels in those additional quadrows. This is shown as the feedback from the positive exit of 1690 to 1650. For example, in some embodiments, while the transcoder is processing the CAVLC encoded block data for the blocks of pixels in one quadrow (e.g., retrieving it from the DMA buffers and merging it into a single output bit stream), the block processing pipeline may continue to encode syntax elements of other blocks of pixels in other quadrows and to write that CAVLC encoded block data to the DMA buffers to be subsequently retrieved (in scan order) and further processed by the transcoder. Once there are no more quadrows to be processed by the CABAC component, the CABAC component may be finished processing the current video frame, as in 1695.

Slice Handling

In at least some embodiments, slices in frames (e.g., slices as defined by the H.264 standard) may be handled by the block processing pipeline associating slice identifiers (IDs) with each macroblock in a slice. The transcoder may then generate the same slice IDs by parsing header information contained in SEI messages.

Example Video Encoder Apparatus

FIG. 17 is a block diagram of an example video encoder apparatus 1700, according to at least some embodiments. The video encoder apparatus 1700 may, for example, be implemented as an integrated circuit (IC) or as a subsystem on an IC such as a system-on-a-chip (SOC). In at least some embodiments, the video encoder apparatus 1700 may include a pipeline 1740 component, a processor 1710 component (e.g., a low-power multicore processor), a memory management unit (MMU) 1720, DMA 1730, and an interconnect 1750 such as a bus subsystem or fabric that interconnects the functional components of the apparatus. The processor 1710 component of the video encoder apparatus 1700 may, for example, perform frame-level control of the pipeline 1740 such as rate control, perform pipeline 1740 configuration including configuration of individual pipeline units within the pipeline 1740, and interface with application software via a driver, for example for video encoder 1700 configuration. The MMU 1720 may serve as an interface to external memory, for example for streaming video input and/or output. Pipeline 1740 component may access memory through MMU 1720 via DMA 1730. In some embodiments, the video encoder apparatus 1700 may include other functional components or units not shown in FIG. 17, or fewer functional components than those shown in FIG. 17. An example block processing method that may be implemented by pipeline 1740 component is shown in FIG. 10. An example a system-on-a-chip (SOC) that may include at least one video encoder apparatus 1700 is illustrated in FIG. 18.

Example System on a Chip (SOC)

Turning now to FIG. 18, a block diagram of one embodiment of a system-on-a-chip (SOC) 1800 that may include at least one instance of a video encoder apparatus including a block processing pipeline that may implement one or more of the block processing methods and apparatus as illustrated in FIGS. 3 through 17. SOC 1800 is shown coupled to a memory 1850. As implied by the name, the components of the SOC 1800 may be integrated onto a single semiconductor substrate as an integrated circuit "chip." In some embodiments, the components may be implemented on two or more discrete chips in a system. However, the SOC 1800 will be used as an example herein. In the illustrated embodiment, the components of the SOC 1800 include a central processing unit (CPU) complex 1820, on-chip peripheral components 1840A-1840B (more briefly, "peripherals"), a memory controller (MC) 1830, a video encoder 1700 (which may itself be considered a peripheral component), and a communication fabric 1810. The components 1820, 1830, 1840A-1840B, and 1700 may all be coupled to the communication fabric 1810. The memory controller 1830 may be coupled to the memory 1850 during use, and the peripheral 1840B may be coupled to an external interface 1860 during use. In the illustrated embodiment, the CPU complex 1820 includes one or more processors (P) 1824 and a level two (L2) cache 1822. In some embodiments, the CPU complex may be configured to cache neighbor data, which may include source transform coefficients (e.g., DC transform coefficients), modified transform coefficients, previously computed quantization errors, and/or weighting coefficient values for one or more neighbor pixels, among other information used in the video encoding operations described herein.

The peripherals 1840A-1840B may be any set of additional hardware functionality included in the SOC 1800. For example, the peripherals 1840A-1840B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 1860 external to the SOC 1800 (e.g. the peripheral 1840B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 18, SOC 1800 may include at least one instance of a video encoder 1700 component, for example a video encoder 1700 as illustrated in FIG. 17 that includes a block processing pipeline 1740 component that implements a block processing method 1000 as illustrated in FIG. 10. Video encoder 1700 may be an H.264 video encoder apparatus that may be configured to convert input video frames from an input format into H.264/Advanced Video Coding (AVC) format as described in the H.264/AVC standard. The block processing pipeline 1740 may implement one or more of the block processing methods and apparatus as described herein in relation to FIGS. 3 through 16.

The CPU complex 1820 may include one or more CPU processors 1824 that serve as the CPU of the SOC 1800. The CPU of the system includes the processor(s) that execute the main control software of the system, such as an operating system. Generally, software executed by the CPU during use may control the other components of the system to realize the desired functionality of the system. The processors 1824 may also execute other software, such as application programs. The application programs may provide user functionality, and may rely on the operating system for lower level device control. Accordingly, the processors 1824 may also be referred to as application processors. The CPU complex 1820 may further include other hardware such as the L2 cache 1822 and/or and interface to the other components of the system (e.g. an interface to the communication fabric 1810). Generally, a processor may include any circuitry and/or microcode configured to execute instructions defined in an instruction set architecture implemented by the processor. The instructions and data operated on by the processors in response to executing the instructions may generally be stored in the memory 1850, although certain instructions may be defined for direct processor access to peripherals as well. In some embodiments, the data stored in memory 1850 may include weighting coefficient values to be applied for one or more neighbor pixels in a neighbor-data-based dithering operation. Processors may encompass processor cores implemented on an integrated circuit with other components as a system on a chip (SOC 1800) or other levels of integration. Processors may further encompass discrete microprocessors, processor cores and/or microprocessors integrated into multichip module implementations, processors implemented as multiple integrated circuits, etc.

The memory controller 1830 may generally include the circuitry for receiving memory operations from the other components of the SOC 1800 and for accessing the memory 1850 to complete the memory operations. The memory controller 1830 may be configured to access any type of memory 1850. For example, the memory 1850 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 1830 may include queues for memory operations, for ordering (and potentially reordering) the operations and presenting the operations to the memory 1850. The memory controller 1830 may further include data buffers to store write data awaiting write to memory and read data awaiting return to the source of the memory operation. In some embodiments, the memory controller 1830 may include a memory cache to store recently accessed memory data. In SOC implementations, for example, the memory cache may reduce power consumption in the SOC by avoiding reaccess of data from the memory 1850 if it is expected to be accessed again soon. In some cases, the memory cache may also be referred to as a system cache, as opposed to private caches such as the L2 cache 1822 or caches in the processors 1824, which serve only certain components. Additionally, in some embodiments, a system cache need not be located within the memory controller 1830.

In an embodiment, the memory 1850 may be packaged with the SOC 1800 in a chip-on-chip or package-on-package configuration. A multichip module configuration of the SOC 1800 and the memory 1850 may be used as well. Such configurations may be relatively more secure (in terms of data observability) than transmissions to other components in the system (e.g. to the end points 16A-16B). Accordingly, protected data may reside in the memory 1850 unencrypted, whereas the protected data may be encrypted for exchange between the SOC 1800 and external endponts.

The communication fabric 1810 may be any communication interconnect and protocol for communicating among the components of the SOC 1800. The communication fabric 1810 may be bus-based, including shared bus configurations, cross bar configurations, and hierarchical buses with bridges. The communication fabric 1810 may also be packet-based, and may be hierarchical with bridges, cross bar, point-to-point, or other interconnects.

It is noted that the number of components of the SOC 1800 (and the number of subcomponents for those shown in FIG. 18, such as within the CPU complex 1820) may vary from embodiment to embodiment. There may be more or fewer of each component/subcomponent than the number shown in FIG. 18.

Example System

Figure 19:
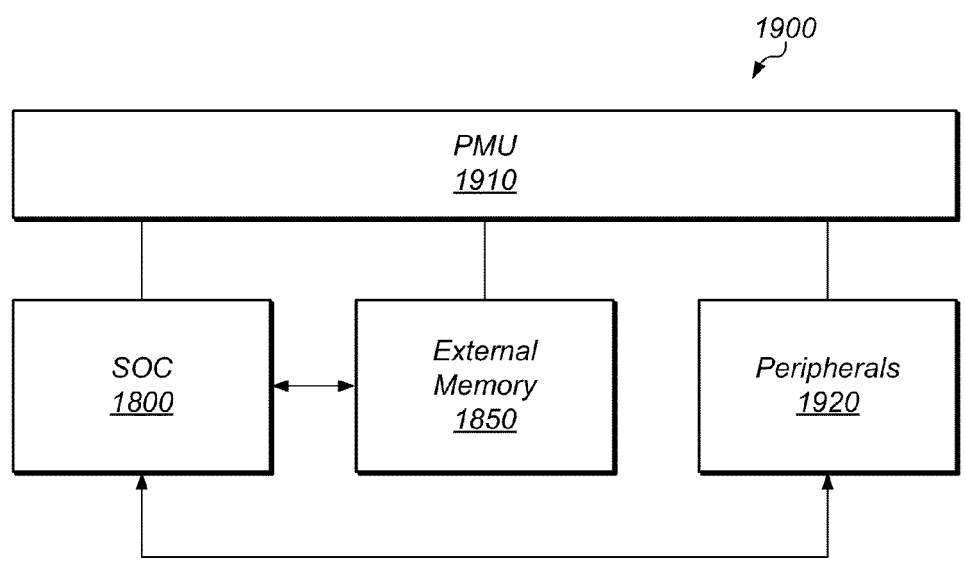
FIG. 19 is a block diagram illustrating one embodiment of a system that includes at least one instance of an SOC.

FIG. 19 a block diagram of one embodiment of a system 1900. In the illustrated embodiment, the system 1900 includes at least one instance of the SOC 1800 coupled to one or more external peripherals 1920 and the external memory 1850. A power management unit (PMU) 1910 is provided which supplies the supply voltages to the SOC 1800 as well as one or more supply voltages to the memory 1850 and/or the peripherals 1920. In some embodiments, more than one instance of the SOC 1800 may be included (and more than one memory 1850 may be included as well).

The peripherals 1920 may include any desired circuitry, depending on the type of system 1900. For example, in one embodiment, the system 1900 may be a mobile device (e.g. personal digital assistant (PDA), smart phone, etc.) and the peripherals 1920 may include devices for various types of wireless communication, such as wifi, Bluetooth, cellular, global positioning system, etc. The peripherals 1920 may also include additional storage, including RAM storage, solid state storage, or disk storage. The peripherals 1920 may include user interface devices such as a display screen, including touch display screens or multitouch display screens, keyboard or other input devices, microphones, speakers, etc. In other embodiments, the system 1900 may be any type of computing system (e.g. desktop personal computer, laptop, workstation, net top etc.).

The external memory 1850 may include any type of memory. For example, the external memory 1850 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 1850 may include one or more memory modules to which the memory devices are mounted, such as single inline memory modules (SIMMs), dual inline memory modules (DIMMs), etc. Alternatively, the external memory 1850 may include one or more memory devices that are mounted on the SOC 1800 in a chip-on-chip or package-on-package implementation.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
a block processing pipeline comprising a plurality of stages, each stage configured to perform one or more operations on a block of pixels passing through the pipeline;
a transcode pipeline configured to operate substantially in parallel with the block processing pipeline; and
a plurality of buffers, each buffer corresponding to one of a plurality of rows of blocks of pixels in a frame;
wherein an encoding component of the block processing pipeline is configured to:
process a plurality of blocks of pixels from a frame using wavefront ordering; and
write each of the processed blocks output by the encoding component to a respective one of the plurality of buffers such that the processed blocks written to each one of the plurality of buffers represent consecutive blocks of pixels from a respective row in the frame in scan order; and
wherein a component of the transcode pipeline is configured to:
read the processed blocks from the plurality of buffers in scan order; and
provide the processed blocks in scan order to another component for further processing.

2. The apparatus of claim 1, wherein to process the plurality of blocks of pixels using wavefront ordering, the encoding component of the block processing pipeline is configured to process the plurality of blocks of pixels according to knight's order such that each processed block is located in the frame one row down and at least one column to the left of the location of the previously processed block.

3. The apparatus of claim 1, wherein the plurality of buffers comprises four direct memory access buffers.

4. The apparatus of claim 1, wherein the plurality of buffers is configured to store at least a number of processed blocks equal to the number of blocks of pixels in four consecutive rows of blocks in the frame.

5. The apparatus of claim 1, wherein the component of the transcode pipeline is configured to read the processed blocks from the plurality of buffers in scan order in response to determining that at least the number of blocks of pixels in four consecutive rows of blocks in the frame have been processed by the encoding component of the block processing pipeline.

6. The apparatus of claim 1,
wherein, for each of the processed blocks, in scan order, the component of the transcode pipeline is further configured to:
decode the processed block; and
encode the decoded block according to a different encoding format; and
wherein to provide the processed blocks in scan order to another component for further processing, the component of the transcode pipeline is configured to provide a single bit stream of data encoded according to the different encoding format.

7. The apparatus of claim 6, wherein the different encoding format is context-adaptive binary arithmetic coding, wherein the encoding component of the block processing pipeline is configured to process additional blocks of pixels from the frame using wavefront ordering while the component of the transcode pipeline decodes and encodes the processed blocks.

8. The apparatus of claim 1,
wherein to provide the processed blocks in scan order to another component for further processing, the component of the transcode pipeline is configured to:
merge the processed blocks into a single bit stream of data; and
provide the single bit stream of data to the other component.

9. A method, comprising:
beginning a video encoding operation for a portion of a frame, wherein the portion of the frame comprises a plurality of blocks of pixels in each of two or more consecutive rows of blocks in the frame;
encoding each of the plurality of blocks of pixels using context-adaptive variable-length coding according to knight's order such that each encoded block is located in the frame one row down and at least one column to the left of the location of the previously encoded block, wherein for each of the plurality of blocks, said encoding comprises writing out the encoded block to a respective one of a plurality of buffers such that the encoded blocks written to each one of the plurality of buffers represent consecutive blocks of pixels in the frame in scan order;
reading the encoded blocks from the plurality of buffers in scan order; and
merging the encoded blocks into a single bit stream of encoded data.

10. The method of claim 9, wherein the single bit stream of encoded data comprises a single bit stream of data encoded using context-adaptive variable-length coding.

11. The method of claim 9,
wherein the method further comprises, for each of the encoded blocks in scan order:
decoding the encoded block; and
encoding the decoded block using context-adaptive binary arithmetic coding; and
wherein the single bit stream of encoded data comprises a single bit stream of data encoded using context-adaptive binary arithmetic coding.

12. The method of claim 9, wherein said reading is performed in response to determining that all of the blocks of pixels in the two or more consecutive rows of blocks in the frame have been encoded.

13. The method of claim 9, further comprising:
subsequent to encoding all of the plurality of blocks of pixels using context-adaptive variable-length coding and prior to completing said merging, beginning a video encoding operation for another portion of the frame, wherein the other portion of the frame comprises a plurality of blocks of pixels in each of two or more consecutive rows of blocks in the frame.

14. The method of claim 9, wherein for each of the plurality of blocks, said writing out the encoded block to a respective one of a plurality of buffers comprises writing the encoded block to a buffer that follows a most recently written buffer in a rotation order for the plurality of buffers.

15. A device, comprising:
a memory; and
an apparatus configured to process video frames, the apparatus comprising:
- a block processing pipeline comprising a plurality of processing units, each processing unit configured to perform one or more operations on a block of pixels passing through the pipeline;
- a transcode pipeline configured to operate substantially in parallel with the block processing pipeline; and
- a plurality of buffers;
- wherein the block processing pipeline is configured to:
  - process a plurality of blocks of pixels from a frame using wavefront ordering; and
  - write each of the processed blocks output by the block processing pipeline to a respective one of the plurality of buffers such that the processed blocks written to each one of the plurality of buffers represent consecutive blocks of pixels in the frame in scan order; and
- wherein the transcode pipeline is configured to:
  - read the processed blocks from the plurality of buffers in scan order;
  - merge the processed blocks into a single bit stream of encoded data; and
  - store the single bit stream of encoded data to the memory;
- wherein the block processing pipeline is configured to process additional blocks of pixels from the frame using wavefront ordering while the transcode pipeline reads and merges the processed blocks.

16. The device of claim 15,
wherein to process the plurality of blocks, the block processing pipeline is configured to encode the blocks using context-adaptive variable-length coding;
wherein to merge the processed blocks into a single bit stream of encoded data, the transcode pipeline is configured to:
  decode the processed blocks; and
  encode the decoded blocks using context-adaptive binary arithmetic coding; and
wherein the single bit stream of encoded data comprises a single bit stream of data encoded using context-adaptive binary arithmetic coding.

17. The device of claim 15,
wherein to process the plurality of blocks, the block processing pipeline is configured to encode the blocks using context-adaptive variable-length coding; and
wherein the single bit stream of encoded data comprises a single bit stream of data encoded using context-adaptive variable-length coding.

18. The device of claim 15, wherein the transcode pipeline is configured to read the processed blocks from the plurality of buffers in scan order in response to determining that at least the number of blocks of pixels in a portion of the frame having a pre-defined number of rows of blocks have been processed by the block processing pipeline.

19. The device of claim 15, wherein to process the plurality of blocks of pixels using wavefront ordering, the block processing pipeline is configured to process the plurality of blocks of pixels according to knight's order such that each processed block is located in the frame one row down and at least one column to the left of the location of a block processed immediately prior to the processed block.

* * * * *